United States Patent
Tsuboi et al.

(10) Patent No.: US 7,903,315 B2
(45) Date of Patent: Mar. 8, 2011

(54) MICRO OSCILLATING DEVICE

(75) Inventors: Osamu Tsuboi, Kawasaki (JP); Norinao Kouma, Kawasaki (JP); Yoshihiro Mizuno, Kawasaki (JP); Hiromitsu Soneda, Kawasaki (JP); Hisao Okuda, Kawasaki (JP); Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/484,456

(22) Filed: Jun. 15, 2009

(65) Prior Publication Data

US 2010/0007940 A1 Jan. 14, 2010

(30) Foreign Application Priority Data

Jul. 14, 2008 (JP) ................. 2008-182642

(51) Int. Cl.
G02B 26/00 (2006.01)
(52) U.S. Cl. ........................ 359/290; 359/291
(58) Field of Classification Search .................. 359/290, 359/291
See application file for complete search history.

(56) References Cited

U.S. PATENT DOCUMENTS

| 6,429,976 B1 | 8/2002 | Yamamoto et al. |
| 2006/0093256 A1 | 5/2006 | Yamashita et al. |
| 2006/0119216 A1* | 6/2006 | Kouma et al. ............... 310/309 |
| 2007/0022827 A1 | 2/2007 | Ishikawa et al. |
| 2007/0277614 A1 | 12/2007 | Takahashi et al. |

FOREIGN PATENT DOCUMENTS

| JP | 2002169107 A | 6/2002 |
| JP | 2003019700 A | 1/2003 |
| JP | 2004341364 A | 12/2004 |
| JP | 2006-72252 A | 3/2006 |
| JP | 2006-126561 A | 5/2006 |
| JP | 2007-33330 A | 2/2007 |
| JP | 2007-327781 A | 12/2007 |

* cited by examiner

*Primary Examiner* — Jordan M. Schwartz
*Assistant Examiner* — James C Jones
(74) *Attorney, Agent, or Firm* — Westerman, Hattori, Daniels & Adrian, LLP

(57) ABSTRACT

A micro oscillating device includes a first frame; an oscillating portion; a first twist coupling portion and a second twist coupling portion coupling the first frame and the oscillating portion to define a first shaft center of an oscillating operation of the oscillating portion; a second frame including a support base and an arm portion extended from the support base toward the oscillating portion; and a third twist coupling portion and a fourth twist coupling portion coupling the second frame and the first frame to define a second shaft center of an oscillating operation of the first frame, wherein the third twist coupling portion is coupled to the first frame and the arm portion between the oscillating portion and the support base, and the fourth twist coupling portion is coupled to the first frame and the support base or the arm portion between the oscillating portion and the support base.

14 Claims, 29 Drawing Sheets

FIG. 3
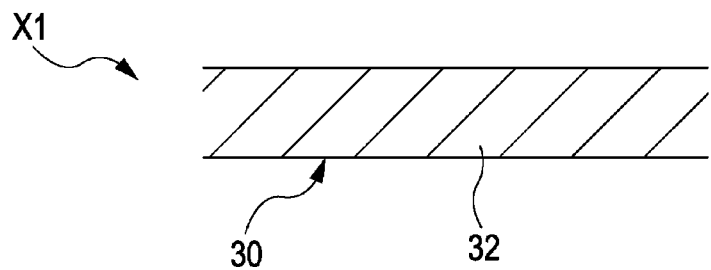
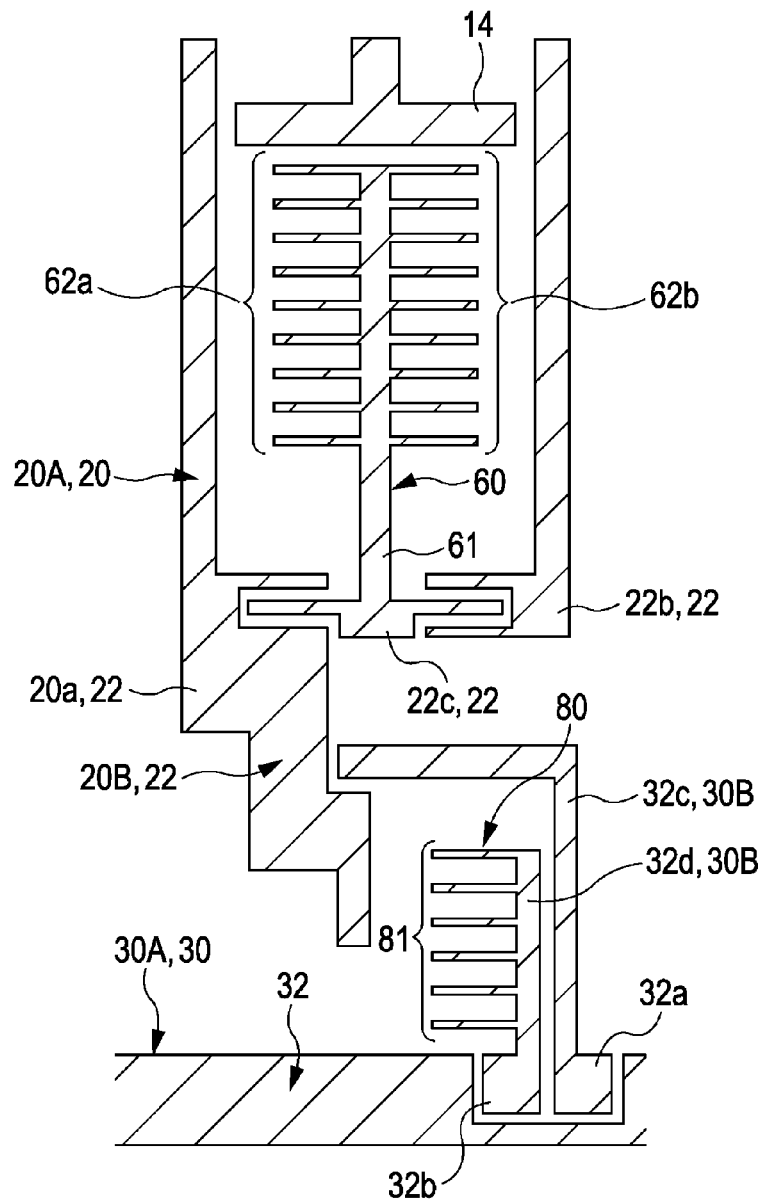

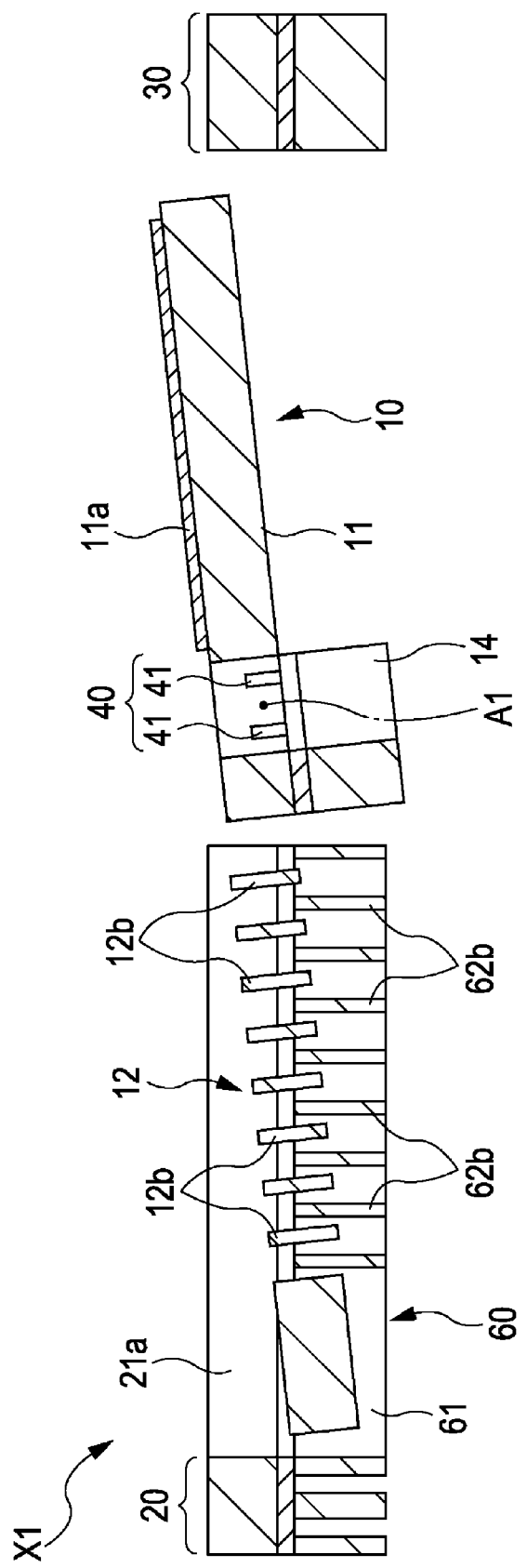

FIG. 17
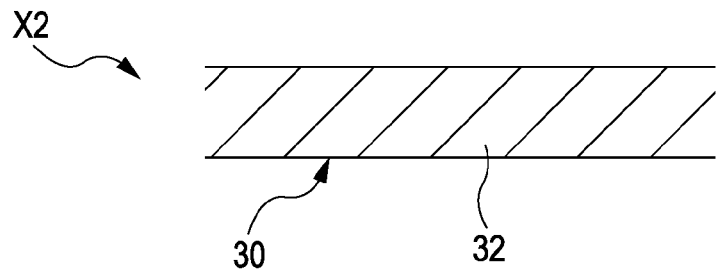
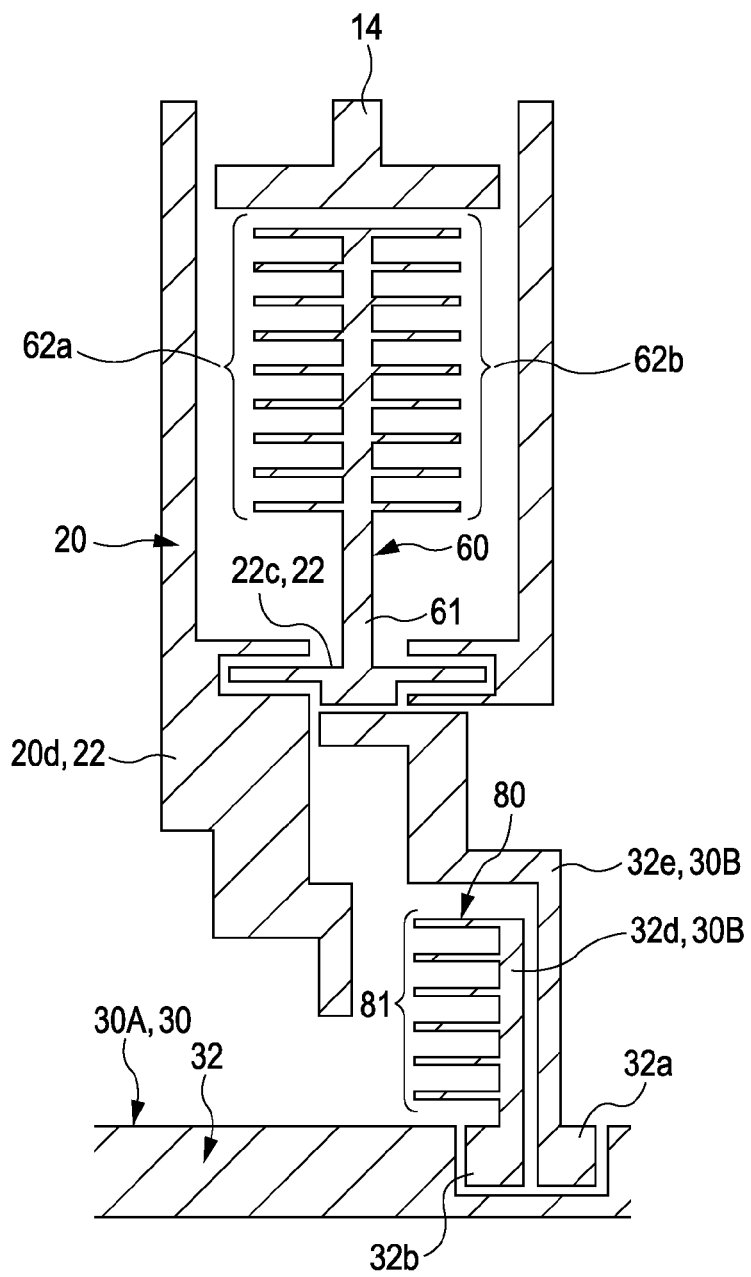

FIG. 22
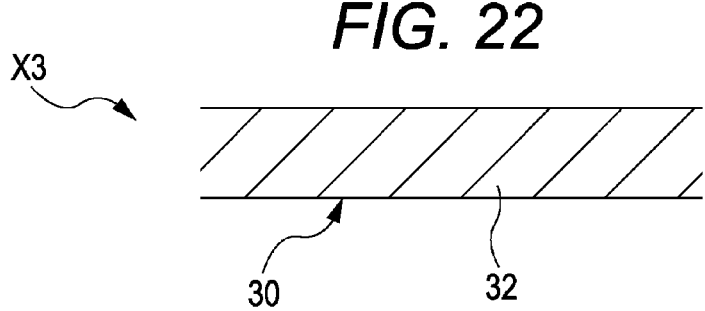
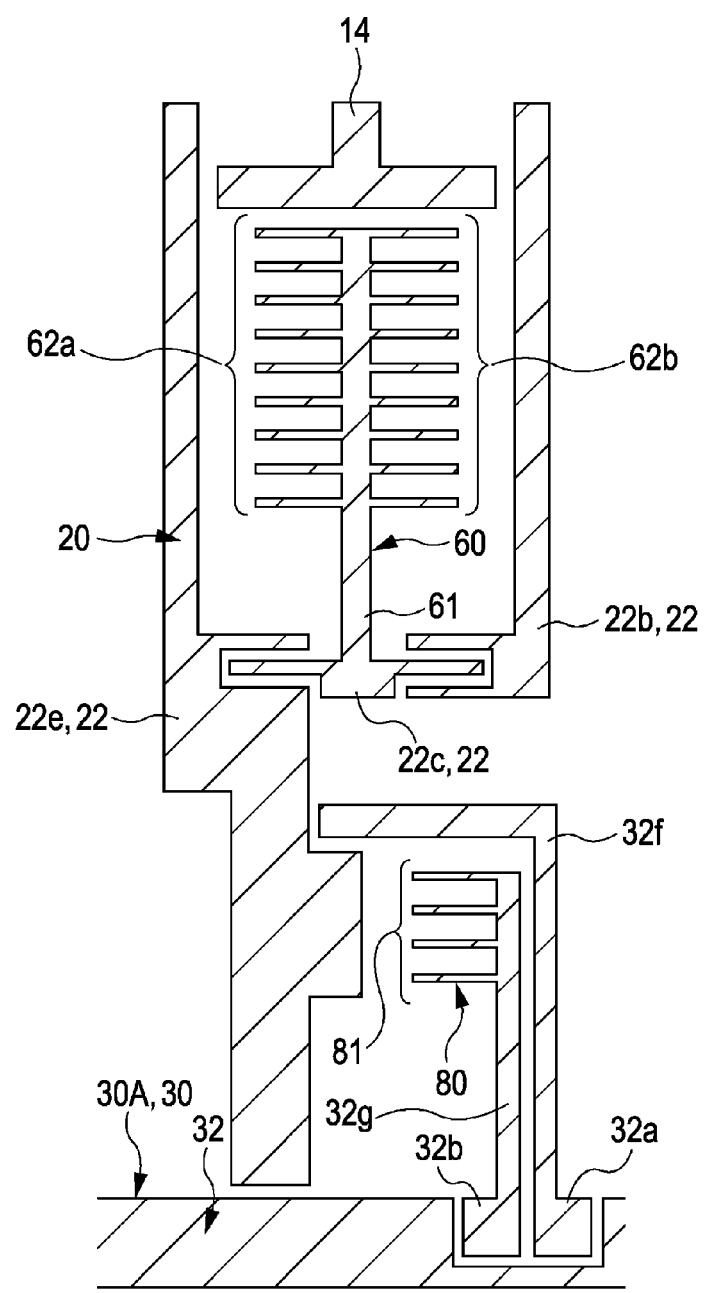

MICRO OSCILLATING DEVICE

CROSS-REFERENCE TO RELATED APPLICATION

This application is based upon and claims the benefit of priority of the prior Japanese Patent Application No. 2008-182642, filed on Jul. 14, 2008, the entire contents of which are incorporated herein by reference.

FIELD

The embodiments discussed herein are related to a micro oscillating device including a micro oscillating portion, for example a micro mirror device, an angular velocity sensor, and an acceleration sensor.

BACKGROUND

Recently devices having micro structures formed by a micromachining technique are applied in various technical fields. A micro oscillating device, such as a micro mirror device, an acceleration sensor, and an angular velocity sensor, which includes a micro oscillating portion, can be cited as an example of the devices. The micro mirror device is used as a device that plays a light reflection function in an optical disk technology or optical communication technology. For example, the angular velocity sensor and the acceleration sensor are used in an image stabilizer of a video camera and a camera-equipped mobile telephone, an automobile navigation system, an airbag development timing system, and attitude control system of an automobile or a robot. For example, Japanese Patent Application Laid-Open Nos. 2003-19700, 2004-341364, and 2006-72252 disclose the micro oscillating devices.

SUMMARY

According to an aspect of the embodiment, a micro oscillating device includes a first frame; an oscillating portion; a first twist coupling portion and a second twist coupling portion that couple the first frame and the oscillating portion to define a first shaft center of an oscillating operation of the oscillating portion; a second frame that includes a support base and an arm portion extended from the support base toward the oscillating portion; and a third twist coupling portion and a fourth twist coupling portion that couple the second frame and the first frame to define a second shaft center of an oscillating operation of the first frame, wherein the third twist coupling portion is coupled to the first frame and the arm portion between the oscillating portion and the support base, and the fourth twist coupling portion is coupled to the first frame and the support base or the arm portion between the oscillating portion and the support base.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a plan view partially illustrating the micro oscillating device of the first embodiment;

FIG. 10 is a sectional view taken on a line IV-IV of FIG. 2 in a state in which an oscillating portion is rotated;

FIG. 17 is a plan view partially illustrating the micro oscillating device of the second embodiment;

FIG. 22 is a plan view partially illustrating the micro oscillating device of the third embodiment;

DESCRIPTION OF EMBODIMENTS

Figure 1:
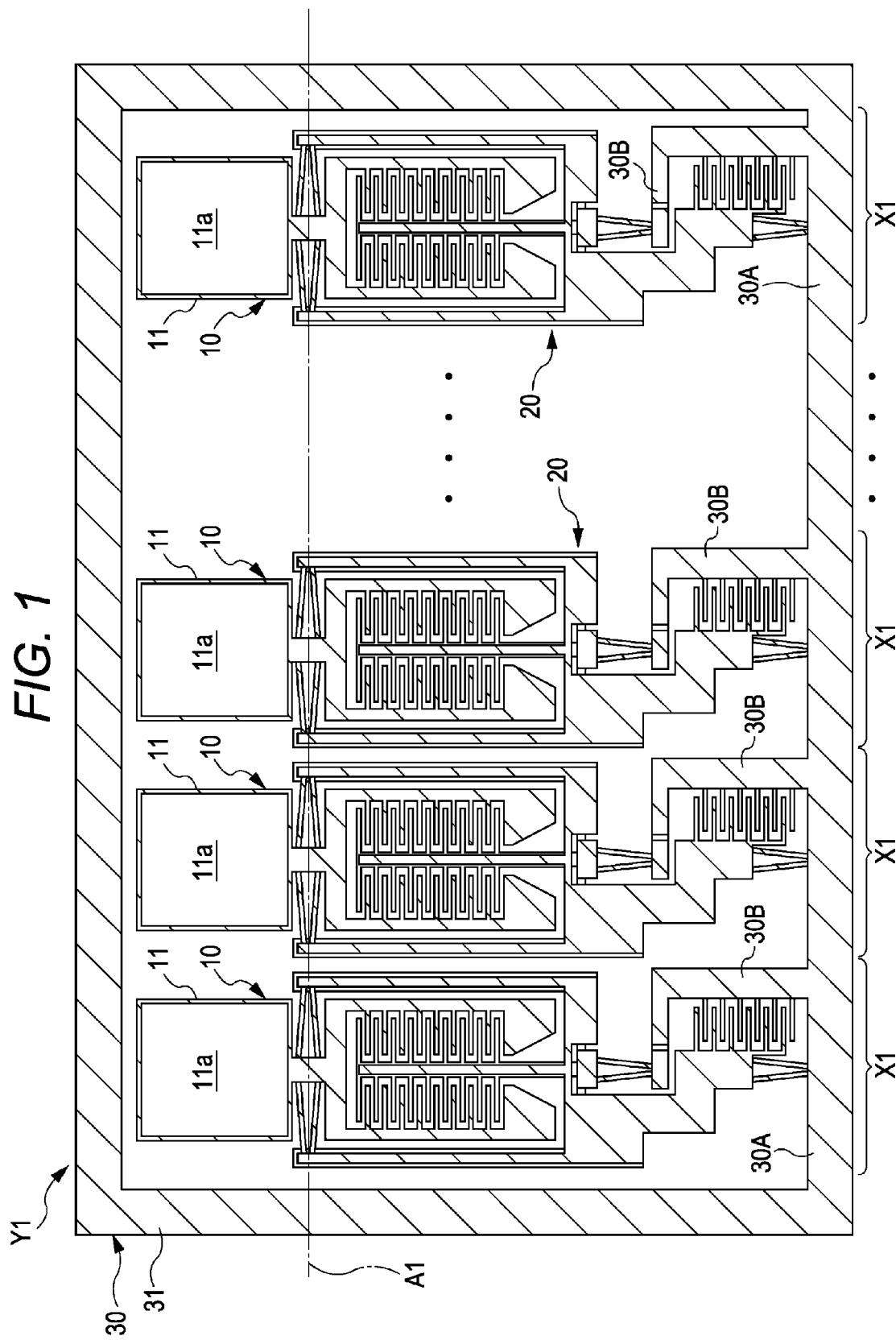
FIG. 1 is a plan view illustrating a micro oscillating device array according to a first embodiment.

FIG. 1 is a plan view illustrating a micro oscillating device array Y1 according to a first embodiment. The micro oscillating device array Y1 includes plural micro oscillating devices X1.

Figure 2:
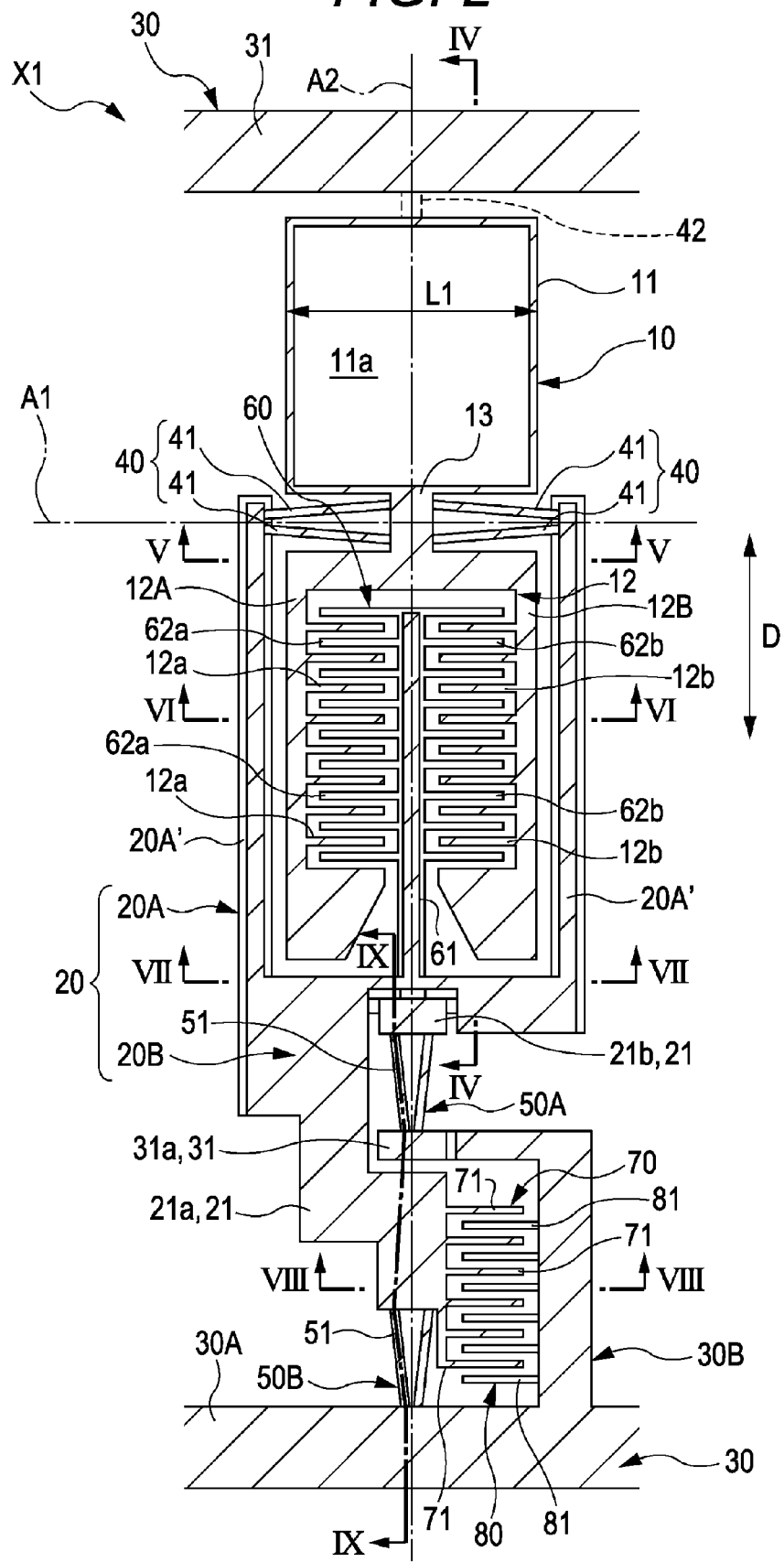
FIG. 2 is a plan view illustrating a micro oscillating device included in the micro oscillating device array of the first embodiment.

FIGS. 2 to 9 illustrate the micro oscillating device X1 included in the micro oscillating device array Y1. FIG. 2 is a plan view of the micro oscillating device X1. FIG. 3 is a plan view partially illustrating the micro oscillating device X1. FIGS. 4 to 9 are sectional views taken along a line IV-IV, a line V-V, a line VI-VI, a line VII-VII, a line VIII-VIII, and a line IX-IX of FIG. 2, respectively.

The micro oscillating device X1 includes an oscillating portion 10, a first frame 20, a second frame 30, a first pair of coupling portions 40, a second pair of coupling portions 50A and 50B, and electrode portions 60, 70, and 80. In the first embodiment, for example, the micro oscillating device X1 is applied to a micro mirror device. The micro oscillating device X1 is produced by processing a material substrate that is a so-called SOI (Silicon On Insulator) wafer using a bulk micromachining technology such as a MEMS technique. The material substrate includes a first silicon layer, a second silicon layer, and an insulating layer between the first and second silicon layers. A conductive property is imparted to the first and second silicon layers by doping an impurity. Each region included in the micro oscillating device X1 is formed while mainly derived from the first silicon layer or the second silicon layer. Accordingly, for the purpose of clarification of the drawing, a region that is derived from the first silicon layer and projected toward a near side of the paper plane from the insulating layer is illustrated by hatching in FIGS. 1 and 2. The structure of FIG. 3 is derived from the second silicon layer.

The oscillating portion 10 includes a land portion 11, an electrode portion 12, a beam portion 13, and a shield portion 14.

The land portion 11 is derived from the first silicon layer. A mirror surface 11a having a light reflection function is provided in a surface of the land portion 11. The land portion 11 and the mirror surface 11a constitute at least a part of an oscillating function portion. The numeral L1 of FIG. 2 designates a width of the land portion 11. The numeral L1 ranges from 20 to 300 μm.

Figure 4:
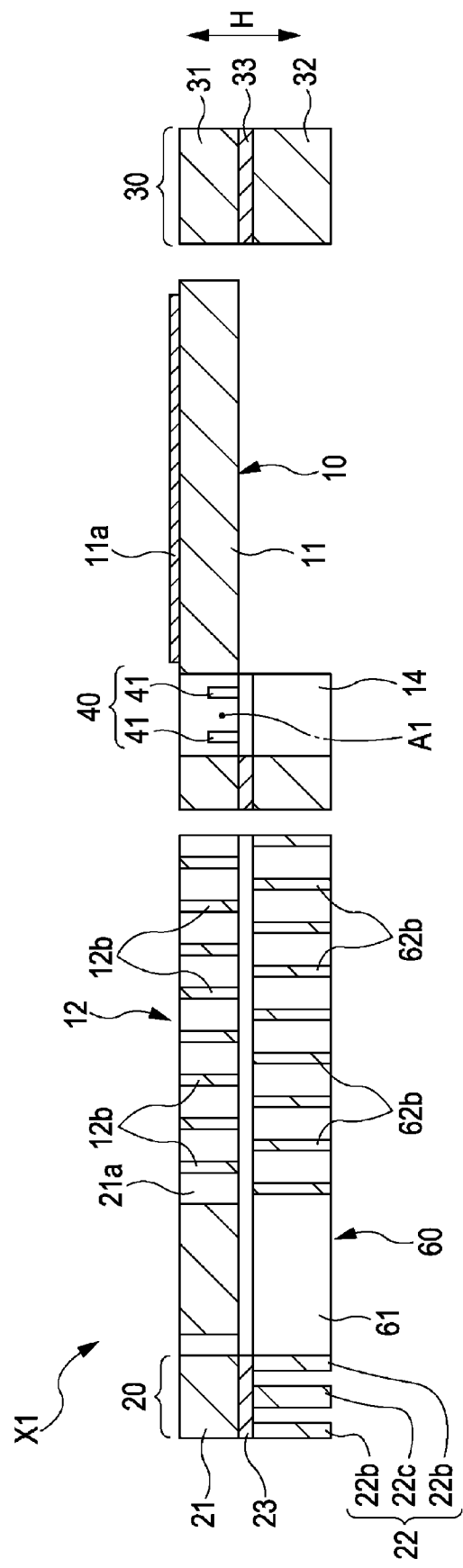
FIG. 4 is a sectional view taken on a line IV-IV of FIG. 2.
Figure 6:
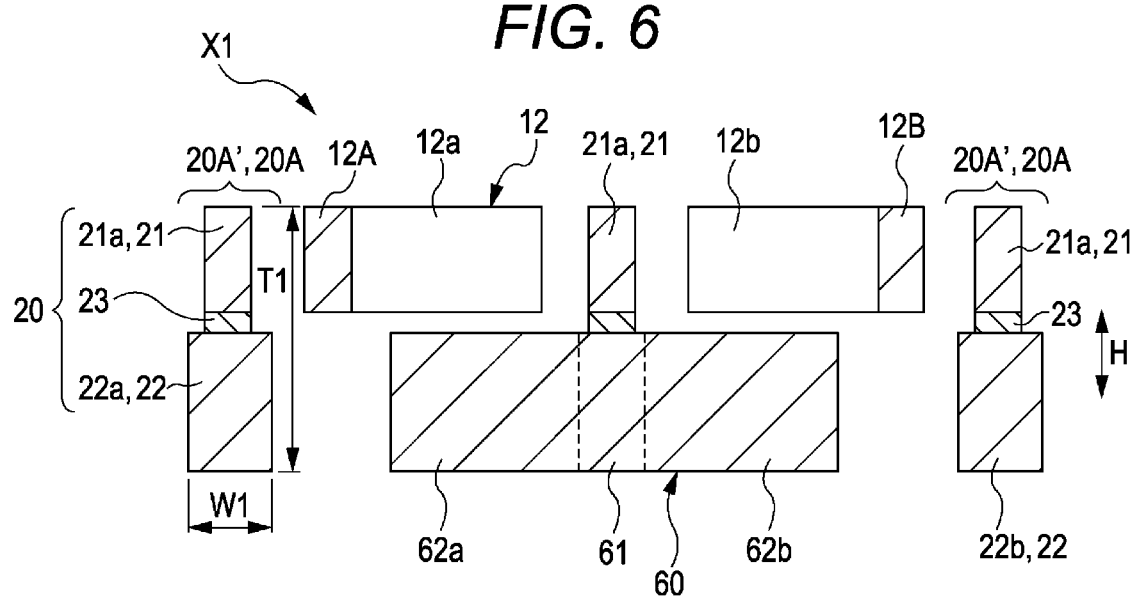
FIG. 6 is a sectional view taken on a line VI-VI of FIG. 2.

The electrode portion 12 is derived from the first silicon layer. The electrode portion 12 includes a pair of arms 12A and 12B, plural electrode teeth 12a, and plural electrode teeth 12b. The arms 12A and 12B are parallel to an arrow D of FIG. 2. As shown in FIGS. 2 and 6, the electrode teeth 12a are extended from the arm 12A toward the arm 12B. As shown in FIG. 2, while separated from one another, the electrode teeth 12a are arranged in a direction in which the arm 12A is extended. The electrode teeth 12b are extended from the arm 12B toward the arm 12A. While separated from one another, the electrode teeth 12b are arranged in a direction in which the arm 12B is extended. Thus, the electrode portion 12 has a comb electrode structure. As shown in FIG. 4 (only the electrode teeth 12b are shown), the electrode teeth 12a and 12b have widths that are smaller than a length in a thickness direction H. The structure is suitable for ensuring bending strengths in the thickness direction H (mechanical strength to a load applied in the thickness direction H) of the electrode portion 12 and micro oscillating device X1. A predetermined reference potential (for example, ground potential) is imparted to the electrode portion 12 in driving the micro oscillating device X1.

The beam portion 13 is derived from the first silicon layer. The beam portion 13 couples the land portion 11 and the electrode portion 12.

Figure 5:
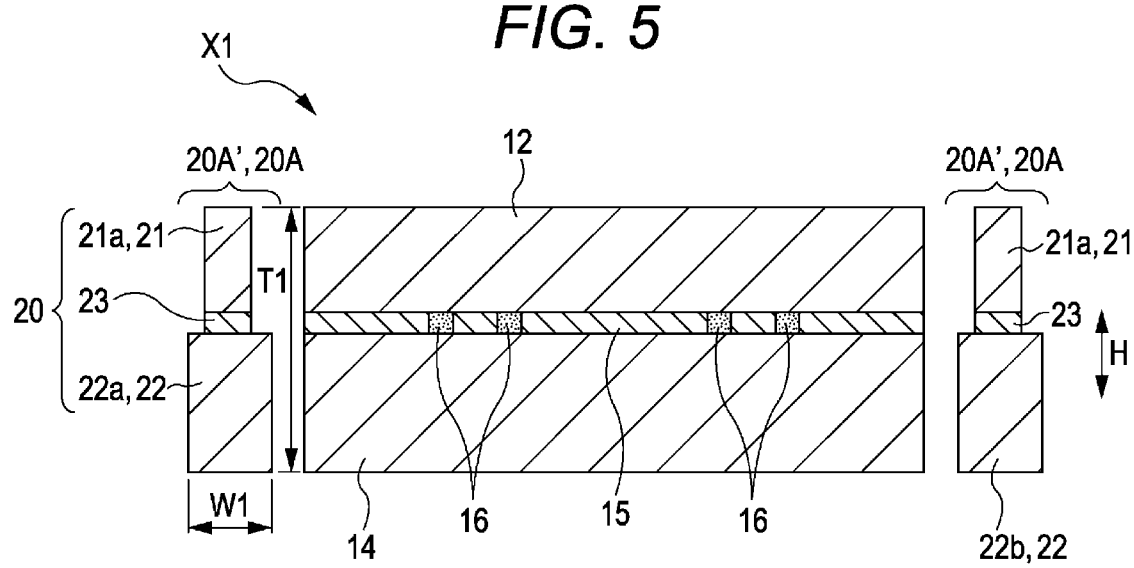
FIG. 5 is a sectional view taken on a line V-V of FIG. 2.

As shown in FIG. 3, the shield portion 14 is derived from the second silicon layer. As shown in FIG. 5, the shield portion 14 is bonded to the electrode portion 12 with the insulating layer 15 interposed therebetween. The shield portion 14 and the electrode portion 12 are electrically connected to each other through a conductive via 16 pierced through the insulating layer 15.

As shown in FIG. 2, the frame 20 includes a surrounding shape portion 20A and an extended shape portion 20B extended from the surrounding shape portion 20A. The surrounding shape portion 20A includes a pair of arms 20A' extended in the direction of the arrow D. The pair of arms 20A' surrounds the electrode portion 12 of the oscillating portion 10. As shown in FIGS. 5 and 6, in the arm 20A', an aspect ratio in which a length T1 in the thickness direction H is divided by a width W1 is larger than one. That is, the frame 20 has a region whose width is smaller than the length in the thickness direction H. The configuration is suitable for ensuring the bending strengths in the thickness direction H (mechanical strength to the load applied in the thickness direction H) of the frame 20, arm 20A', and micro oscillating device X1.

Figure 7:
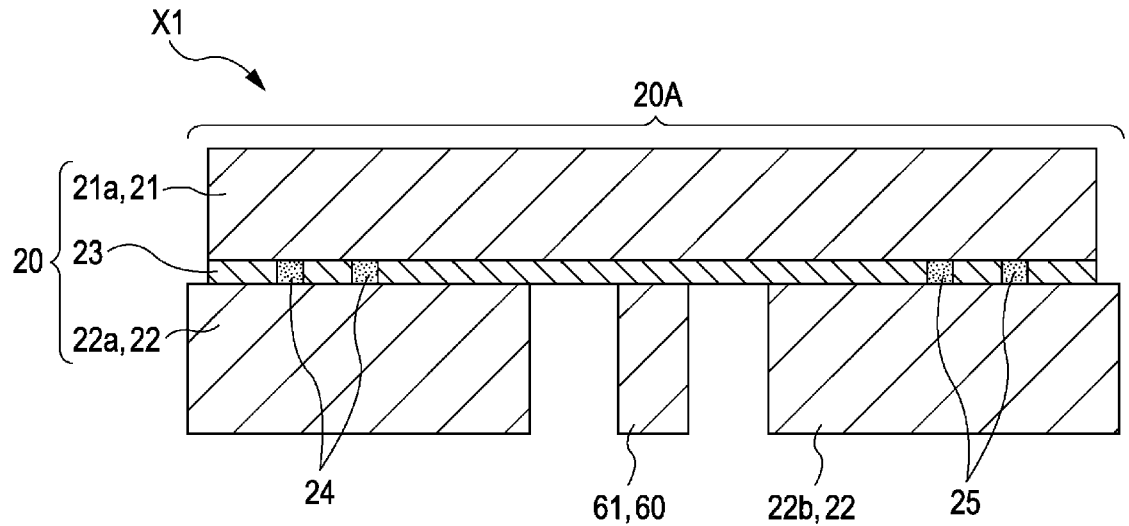
FIG. 7 is a sectional view taken on a line VII-VII of FIG. 2.
Figure 9:
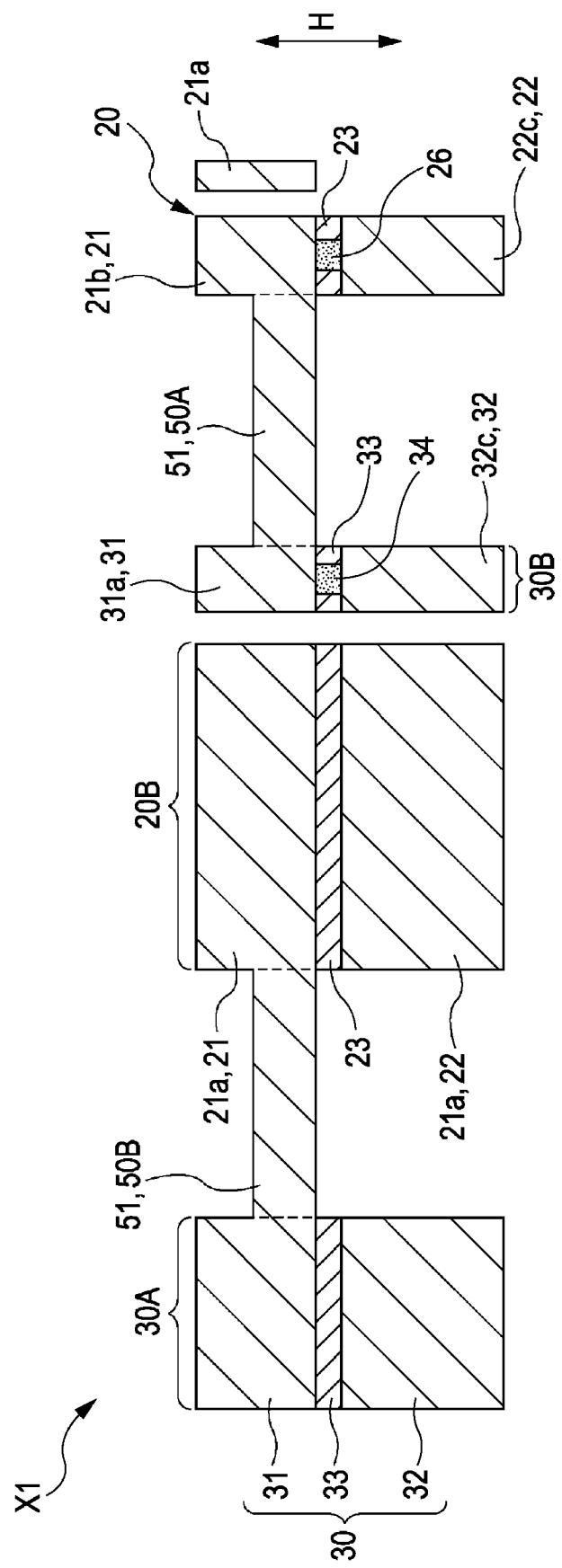
FIG. 9 is a sectional view taken on a line IX-IX of FIG. 2.

As shown in FIGS. 4 and 6, the frame 20 has a laminated structure including a first layer portion 21 derived from the first silicon layer and a second layer portion 22 derived from the second silicon layer, and an insulating layer 23 between the first and second silicon layers. As shown in FIG. 2, the first layer portion 21 includes portions 21a and 21b that are separated with a gap. The portion 21a constitutes a part of the surrounding shape portion 20A of the frame 20 and a part of the extended shape portion 20B. The portion 21b constitutes a part of the surrounding shape portion 20A. As shown in FIG. 3, the second layer portion 22 includes portions 22a, 22b, and 22c that are separated with a gap. The portion 22a constitutes a part of the surrounding shape portion 20A of the frame 20 and a part of the extended shape portion 20B. The portions 22b and 22c constitute a part of the surrounding shape portion 20A. As shown in FIG. 7, the portion 21a of the first layer portion 21 and the portion 22a of the second layer portion 22 are electrically connected through a conductive via 24 pierced through the insulating layer 23. As shown in FIG. 7, the portion 21a of the first layer portion 21 and the portion 22b of the second layer portion 22 are electrically connected through a conductive via 25 pierced through the insulating layer 23. As shown in FIG. 9, the portion 21b of the first layer portion 21 and the portion 22c of the second layer portion 22 are electrically connected through a conductive via 26 pierced through the insulating layer 23.

Figure 8:
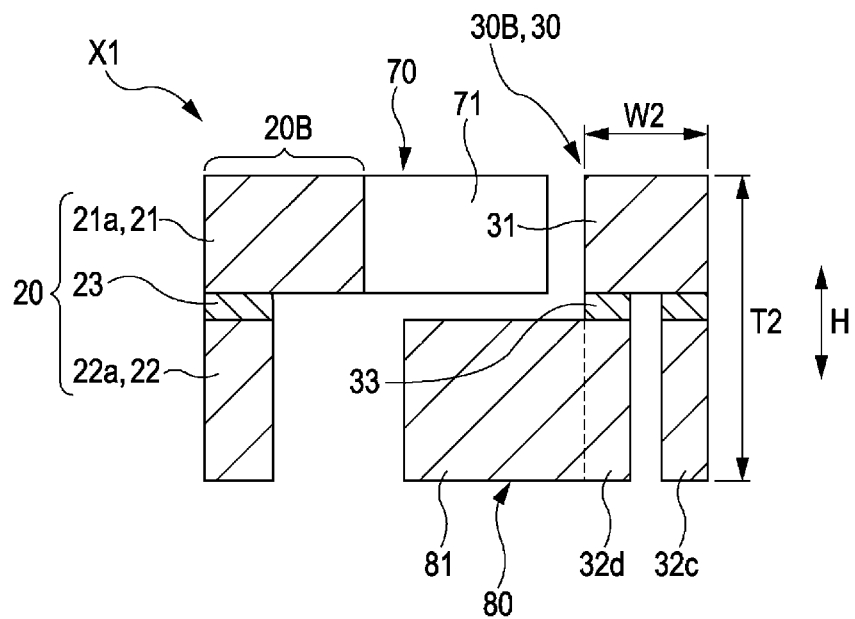
FIG. 8 is a sectional view taken on a line VIII-VIII of FIG. 2.

As shown in FIG. 2, the frame 30 includes a support base 30A and an arm 30B. As shown in FIGS. 8 and 9, the frame 30 has a laminated structure including a first layer portion 31 derived from the first silicon layer, a second layer portion 32 derived from the second silicon layer, and an insulating layer 33 between the first and second silicon layers.

As shown in FIG. 3, in the second layer portion 32, the support base 30A includes portions 32a and 32b that are separated with a gap.

As shown in FIG. 2, the arm 30B is extended from the support base 30A toward the oscillating portion 10, and is bent along the way. As shown in FIG. 8, in the arm 30B, the aspect ratio in which a length T2 in the thickness direction H is divided by a width W2 is larger than one. That is, the arm 30B has a region whose width is smaller than a length in the thickness direction H. The configuration is suitable for ensuring the bending strengths in the thickness direction H (mechanical strength to the load applied in the thickness direction H) of the arm 30B and micro oscillating device X1.

As shown in FIGS. 2 and 9, the arm 30B includes a portion 31a in the first layer portion 31. As shown in FIG. 3, the arm 30B includes portions 32c and 32d that are separated with a gap in the second layer portion 32. The portion 32c is connected to the portion 32a of the support base 30A. The portion 32d is connected to the portion 32b of the support base 30A. As shown in FIG. 9, in the arm 30B, the portion 31a and the portion 32c are electrically connected through a conductive via 34 pierced through the insulating layer 33.

The pair of coupling portions 40 is examples of a first twist coupling portion and a second twist coupling portion. As shown in FIG. 2, each coupling portion 40 includes two torsion bars 41. Each coupling portion 40 is derived from the first silicon layer. Each coupling portion 40 is connected to the beam portion 13 of the oscillating portion 10 and the portion 21a of the first layer portion 21 of the frame 20. Therefore, the oscillating portion 10 and the frame 20 are coupled to each other. The beam portion 13 and the portion 21a are electrically connected with the coupling portion 40 interposed therebetween. An interval between two torsion bars 41 included in each coupling portion 40 is gradually increased from the side of the frame 20 toward the oscillating portion 10. As shown in FIG. 4, the torsion bar 41 in the thickness direction H is thinner than the oscillating portion 10 and thinner than the first layer portion 21 of the frame 20. The pair of coupling portions 40 defines a shaft center A1 of the oscillating operations of the oscillating portion 10 and land portion 11. The shaft center A1 is orthogonal to the direction of the arrow D of FIG. 2. The direction of the arrow D corresponds to the direction in which the arms 12A and 12B of the electrode portion 12 are extended. Each coupling portion 40 including the two torsion bars 41 whose interval is gradually increased from the side of the frame 20 toward the oscillating portion 10 restrains generation of an unnecessary displacement component in an oscillating operation of the oscillating portion 10.

The pair of coupling portions 50A and 50B are examples of a third twist coupling portion and a fourth twist coupling portion. As shown in FIG. 2, each of the coupling portions 50A and 50B includes two torsion bars 51. Each of the coupling portions 50A and 50B is derived from the first silicon layer. Each of the coupling portions 50A and 50B couples the frame 20 and the frame 30. Specifically, as shown in FIGS. 2 and 9, the coupling portion 50A connects the portion 21b of the first layer portion 21 of the frame 20 and the portion 31a of the first layer portion 31 in the arm 30B of the frame 30. Therefore, the frame 20 and the frame 30 are coupled to each other. The portions 21b and 31a are electrically connected with the coupling portion 50A interposed therebetween. The coupling portion 50B connects the portion 21a of the first layer portion 21 of the frame 20 and the first layer portion 31 in the support base 30A of the frame 30. Therefore, the frame 20 and the frame 30 are coupled to each other. The portion 21a and a part of the first layer portion 31 of the support base 30A are electrically connected with the coupling portion 50B interposed therebetween. An interval between the two torsion bars 51 included in each of the coupling portions 50A and 50B is gradually increased toward the frame 20 from the side of the frame 30. As shown in FIG. 9, the torsion bar 51 in the thickness direction H is thinner than the frames 20 and 30. The pair of coupling portions 50A and 50B defines a shaft center A2 of the oscillating operations of the frame 20 and oscillating portion 10. In the first embodiment, the shaft center A2 is orthogonal to the shaft center A1. Each of the coupling portion 50A and 50B including the two torsion bars 51 whose interval is gradually increased toward the frame 20 from the side of the frame 30 restrains the generation of the unnecessary displacement component in the oscillating operations of the frame 20 and oscillating portion 10.

The electrode portion 60 is derived from the second silicon layer. As shown in FIG. 3, the electrode portion 60 includes an arm 61, plural electrode teeth 62a, and plural electrode teeth 62b. The arm 61 is extended from the portion 22c of the second layer portion 22 of the frame 20. The plural electrode teeth 62a are extended from the arm 61 toward the arm 12A of the electrode portion 12. While separated from one another, the plural electrode teeth 62a are arranged in the direction in which the arm 61 is extended. The plural electrode teeth 62b are extended from the arm 61 toward the arm 12B of the electrode portion 12. While separated from one another, the plural electrode teeth 62a are arranged in the direction in which the arm 61 is extended. Thus, the electrode portion 60 has a so-called comb electrode structure. As shown in FIG. 4 (only the electrode teeth 62b are shown), each of the electrode teeth 62a and 62b of the electrode portion 60 has a width smaller than a length in the thickness direction H. The configuration is suitable for ensuring the bending strengths in the thickness direction H (mechanical strength to the load applied in the thickness direction H) of the electrode portion 60 and micro oscillating device X1.

The electrode portion 70 is derived from the first silicon layer. As shown in FIG. 2, the electrode portion 70 includes plural electrode teeth 71. As shown in FIGS. 2 and 8, the plural electrode teeth 71 are extended toward the electrode portion 80 from the portion 21a of the first layer portion 21 of the frame 20. While separated from one another, the plural electrode teeth 71 are arranged in the direction in which the shaft center A2 is extended. Thus, the electrode portion 70 has the so-called comb electrode structure. Each of the electrode teeth 71 of the electrode portion 70 has the width that is smaller than the length in the thickness direction H. The configuration is suitable for ensuring the bending strengths in the thickness direction H (mechanical strength to the load applied in the thickness direction H) of the electrode portion 70 and micro oscillating device X1.

The electrode portion 80 is derived from the second silicon layer. As shown in FIGS. 2 and 3, the electrode portion 80 includes plural electrode teeth 81. As shown in FIGS. 3 and 8, the plural electrode teeth 81 are extended toward the electrode portion 70 from the portion 32d in the arm 30B of the frame 30. While separated from one another, the plural electrode teeth 81 are arranged in the direction in which the shaft center A2 is extended. Thus, the electrode portion 80 has the so-called comb electrode structure. Each of the electrode teeth 81 of the electrode portion 80 has the width that is smaller than the length in the thickness direction H. The configuration is suitable for ensuring the bending strengths in the thickness direction H (mechanical strength to the load applied in the thickness direction H) of the electrode portion 80 and micro oscillating device X1.

In the micro oscillating device X1, the pair of electrode portions 12 and 60 is used as a drive mechanism or an actuator that generates a drive force relating to oscillation of the oscillating portion 10 about the shaft center A1. The pair of electrode portions 70 and 80 is used as a drive mechanism or an actuator that generates a drive force relating to oscillations of the frame 20 and the oscillating portion 10 about the shaft center A2.

A predetermined reference potential is imparted to the electrode portion 12 of the oscillating portion 10 and the electrode portion 70 in driving the micro oscillating device X1. The reference potential is imparted to the electrode portion 12 through a part of the first layer portion 31 of the frame 30, the torsion bars 51 of the coupling portion 50B, the portion 21a of the first layer portion 21 of the frame 20, the torsion bars 41 of the coupling portion 40, and the beam portion 13 of the oscillating portion 10. The reference potential is imparted to the electrode portion 70 through a part of the first layer portion 31 of the frame 30, the torsion bars 51 of the coupling portion 50B, and the portion 21a of the first layer portion 21 of the frame 20. Preferably the reference potential is kept constant. For example, the reference potential is a ground potential.

In the micro oscillating device X1, a drive potential that is higher than the reference potential is imparted to the electrode portion 60 as needed. Therefore, an electrostatic attractive force is generated between the electrode portion 12 and the electrode portion 60 to rotate the oscillating portion 10 about the shaft center A1 as shown in FIG. 10. At the same time, in the micro oscillating device X1, the drive potential that is higher than the reference potential is imparted to the electrode portion 80 as needed. Therefore, the electrostatic attractive force is generated between the electrode portion 70 and the electrode portion 80 to rotate the frame 20 and the oscillating portion 10 about the shaft center A2. The micro oscillating device X1 is a so-called two-shaft oscillating device. The drive potential is imparted to the electrode portion 60 through the portion 32a of the second layer portion 32 in the support base 30A of the frame 30, the portion 32c of the second layer portion 32 in the arm 30B, the conductive via 34 connected to the portion 32c, the portion 31a of the first layer portion 31, the torsion bars 51 of the coupling portion 50A, the portion 21b of the first layer portion 21 in the frame 20, the conductive via 26 connected to the portion 21b, and the portion 22c of the second layer portion 22. The drive potential is imparted to the electrode portion 80 through the portion 32b of the second layer portion 32 in the support base 30A of the frame 30 and the portion 32d of the second layer portion 32 in the arm 30B. The direction of the light reflected from the mirror surface 11a of the land portion 11 of the oscillating portion 10 in the micro oscillating device X1 can be switched by the two-shaft oscillation.

The micro oscillating device array Y1 includes the plural micro oscillating devices X1 having the above-described configurations. In the micro oscillating device array Y1, the plural micro oscillating devices X1 are arranged in line such that all the shaft centers A2 (not shown in FIG. 1) are in parallel with one another.

In the micro oscillating device array Y1, the frames 30 of the micro oscillating devices X1 are integrated to form a frame body. The frames 30 surround all movable portions including the oscillating portions 10 and the frames 20 in the micro oscillating devices X1. The first layer portion 31 of the frame 30 is continuously formed in all the micro oscillating devices X1 except for the portions 31a. Accordingly, the electrode portion 12 and shield portion 14 of the oscillating portion 10, the portion 21a of the first layer portion 21 and the portions 22a and 22b of the second layer portion 22 of the frame 20, and the electrode portion 70 are electrically connected in all the micro oscillating devices X1.

In driving the micro oscillating device array Y1, a predetermined reference potential is commonly imparted to the electrode portion 12 of the oscillating portions 10 and the electrode portions 70 in all the micro oscillating devices X1. At this point, the drive potentials are imparted to the electrode portions 60 and 80 of the selected micro oscillating device X1, respectively. Therefore, the oscillating portion 10 and frame 20 of each micro oscillating device X1 are individually oscillated to switch the direction of the light reflected from the mirror surface 11a of the land portion 11 in the oscillating portion 10 of the micro oscillating device X1.

Each micro oscillating device X1 included in the micro oscillating device array Y1 is the two-shaft oscillating device. As described above, each micro oscillating device X1 includes the oscillating portion 10, the frame 20 coupled to the oscillating portion 10, and the frame 30 coupled to the frame 20. In each micro oscillating device X1, the frames 20 and 30 are coupled between the support base 30A of the frame 30 and the oscillating portion 10 by the coupling portions 50A and 50B. Specifically, the coupling portion 50A (two torsion bars 51) that couples the frames 20 and 30 is connected to the frame 20 and the arm 30B between the oscillating portion 10 and the support base 30A, and the coupling portion 50B (two torsion bars 51) is connected to the frame 20 and the support base 30A between the oscillating portion 10 and the support base 30A. That is, in each micro oscillating device X1, the movable portion including the oscillating portion 10 and frame 20 is supported by the support base 30A of the frame 30 while the coupling portions 50A and 50B and the arm 30B are interposed therebetween.

In each micro oscillating device X1 in which the frame 30 supports the movable portion based on a cantilever structure, the oscillating portion 10 is not located between the pair of coupling portions 50A and 50B that couples the frames 20 and 30, so that a long region that does not face the frame 20 can be ensured in an outline of the oscillating portion 10. As a result, because the frame 20 can have the structure in which the frame 20 does not surround the land portion 11 of the oscillating portion 10 as described above, the need for ensuring a space where the two frames 20 are disposed between the oscillating portions 10 of the two adjacent micro oscillating devices X1 or a space where mechanical interference or electric interference between the frames 20 is avoided is eliminated in the micro oscillating device array Y1. Accordingly, in the micro oscillating device array Y1, the land portions 11 of the oscillating portions 10 can sufficiently be brought close to each other in the adjacent micro oscillating devices X1. In the micro oscillating device array Y1, a sufficiently high occupied ratio of the land portion 11 and mirror surface 11a can be realized in the direction in which the devices are arrayed. As the occupied ratio of the land portion 11 and mirror surface 11a is increased, a signal loss of the light reflected from each mirror surface 11a can be reduced in the whole of the micro oscillating device array Y1.

The electrode portion 12 of the oscillating portion 10, the shield portion 14, and the portions 22a and 22b of the second layer portion 22 of the frame 20 are electrically connected in each micro oscillating device X1 of the micro oscillating device array Y1, so that the reference potential (for example, the ground potential) is imparted not only to the electrode portion 12 but also to the shield portion 14 and the portions 22a and 22b in driving the device. Therefore, an electric field is easily absorbed by the shield portion 14. The electric field is caused by a predetermined drive potential that is higher than the reference potential, and is generated from the electrode portion 60 toward the land portion 11 of the oscillating portion 10 in driving the device. That is, the electric field hardly reaches the land portion 11 over the shield portion 14. At the same time, the portions 22a and 22b easily absorb the electric field generated from the electrode portion 60 in driving the device. That is, the electric field hardly leaks outside the device over the sides of the portions 22a and 22b in the second layer portion 22 of the frame 20. The electric field absorption effects prevent or restrain the leakage of the electric field to the outside of the device in the micro oscillating device X1. The electric field leaking from the drive mechanism including the electrode portions 12 and 60 of one of the micro oscillating devices X1 in the micro oscillating device array Y1 can be prevented from adversely affecting a drive characteristic of the adjacent micro oscillating device X1 by the prevention or restraint of the leakage of the electric field to the outside of the device. Accordingly, the electric field absorption effects contribute to the greater density in the direction in which the micro oscillating devices X1 are arrayed and the high occupied ratio of the land portion 11 and mirror surface 11a in the direction in which the devices are arrayed.

In each micro oscillating device X1 of the micro oscillating device array Y1, as described above with reference to FIGS. 5 and 6, in the arm 20A' of the frame 20, the aspect ratio in which the length T1 in the thickness direction H is divided by the width W1 is larger than one. Accordingly, the micro oscillating device X1 has the structure in which the bending strength in the thickness direction H is easy to ensure. At the same time, as described above with reference to FIG. 8, the arm 30B of the frame 30 has the aspect ratio in which the length T2 in the thickness direction H is divided by the width W2 is larger than one. Accordingly, the micro oscillating device X1 has the structure in which the bending strength in the thickness direction H is easy to ensure. In the micro oscillating device X1 in which the support base 30A of the frame 30 supports the movable portion by the cantilever structure, the configuration is suitable for ensuring the bending strength in the thickness direction H in the support structure between the oscillating portion 10 and the support base 30A.

The micro oscillating device X1 can also be applied to sensing devices such as an angular velocity sensor and an acceleration sensor. In the micro oscillating device X1 serving as the sensing device, it is not always necessary to provide the mirror surface 11a on the land portion 11 of the oscillating portion 10.

In driving the micro oscillating device X1 used in the angular velocity sensor, for example, the movable portion (the oscillating portion 10, frame 20, coupling portion 40, and electrode portion 60) is oscillated about the shaft center A2 at a predetermined oscillation frequency or period. The oscillating operation is realized by applying a voltage between the electrode portions 70 and 80 at a predetermined period. In the first embodiment, a predetermined potential is imparted to the electrode portion 80 at a predetermined period while the electrode portion 70 is connected to the ground.

When the predetermined angular velocity acts on the micro oscillating device X1 or oscillating portion 10 while the movable portion is oscillated or vibrated, the oscillating portion 10 is rotated about the shaft center A1. This changes a relative position between the electrode portions 12 and 60 to thereby change a capacitance between the electrode portions 12 and 60. A rotational displacement of the oscillating portion 10 can be detected based on the change in capacitance. The angular velocity acting on the micro oscillating device X1 and oscillating portion 10 can be derived from the detection result.

In driving the micro oscillating device X1 applied to the acceleration sensor, for example, the oscillating portion 10 is caused to rest relative to the frame 20 or electrode portion 60 by applying a direct-current voltage between the electrode portions 12 and 60. At this point, an inertia force having a vector component parallel to the acceleration is generated when the acceleration acts in the direction normal to the micro oscillating device X1 and oscillating portion 10 (direction perpendicular to the paper plane in the planar view of FIG. 2). Therefore, a torque acts on the oscillating portion 10 about the shaft center A1 defined by the pair of coupling portions 40, and the rotational displacement (about the shaft center A1) in proportion to the acceleration is generated in the oscillating portion 10. In the planar view of FIG. 2, the design is made such that a barycentric position of the oscillating portion 10 does not overlap the shaft center A1, which allows the generation of the inertia force. The rotational displacement can electrically be detected as the change in capacitance between the electrode portions 12 and 60. The acceleration acting on the micro oscillating device X1 and oscillating portion 10 can be derived based on the detection result.

FIGS. 11A to 11D and FIGS. 12A to 12D are sectional views illustrating an example of the process for producing each micro oscillating device X1 included in the micro oscillating device array Y1. The producing method used herein is an example of the technique for producing the micro oscillating device X1 through the bulk micromachining technique. FIGS. 11A to 11D and FIGS. 12A to 12D illustrate a process for forming a land portion L, a beam portion B, frames F1 and F2, coupling portions C1 and C2, and a set of electrodes E1 and E2 shown in FIG. 12D as a change of one section. The one section schematically expresses a section included in a compartment in which a single micro oscillating device is formed in the material substrate (wafer having a laminated structure) to be processed. The land portion L corresponds to a part of the land portion 11. The beam portion B corresponds to the beam portion 13 and expresses a transverse section of the beam portion 13. The frame F1 corresponds to the frame 20 and expresses a transverse section of the arm 20A' of the frame 20. The frame F2 corresponds to a part of the frame 30. The coupling portion C1 corresponds to the coupling portion 40 and expresses a section in the direction in which the torsion bar 41 is extended. The coupling portion C2 corresponds to the coupling portions 40, 50A, and 50B and expresses a transverse section of each of the torsion bars 41 and 51. The electrode E1 corresponds to a part of each of the electrode portions 12 and 70, and each transverse section of a set of electrode teeth 12a and each transverse section of a set of electrode teeth 71 are expressed. The electrode E2 corresponds to a part of each of the electrode portions 60 and 80, and each transverse section of a set of electrode teeth 61 and each transverse section of a set of electrode teeth 81 are expressed.

Figure 11A:
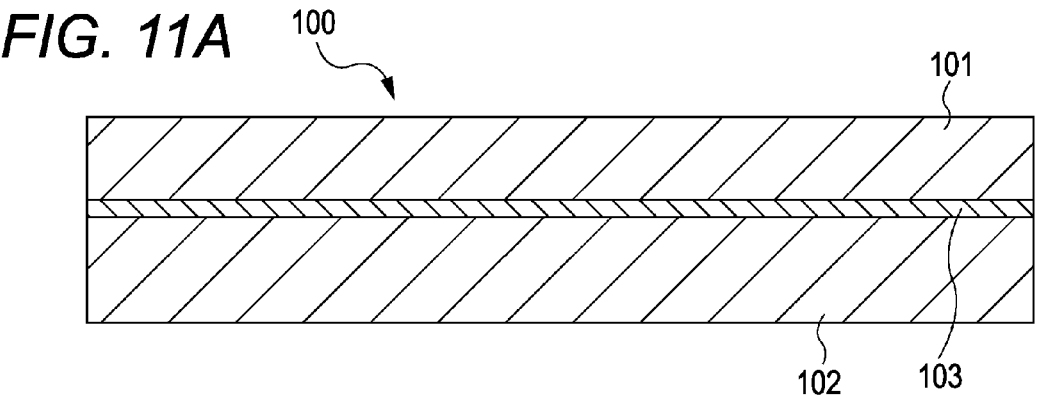
FIGS. 11A to 11D are sectional views illustrating a process for producing the micro oscillating device of the first embodiment.

A material substrate 100 shown in FIG. 11A is prepared in producing the micro oscillating device X1. The material substrate 100 has a laminated structure including silicon layers 101 and 102 and an insulating layer 103 between the silicon layers 101 and 102. For example, an SOI wafer is used as the material substrate 100. In the material substrate 100, a conductive via constituting the conductive vias 16, 24 to 26, and 34 is embedded. The silicon layers 101 and 102 are made of silicon. A conductive property is imparted to the silicon by doping an impurity. A p-type impurity such as B and an n-type impurity such as P and Sb can be cited as an example of the impurity. For example, the insulating layer 103 is made of oxide silicon. For example, a thickness of the silicon layer 101 ranges from 10 to 100 µm. For example, a thickness of the silicon layer 102 ranges from 50 to 500 µm. For example, a thickness of the insulating layer 103 ranges from 0.3 to 3 µm.

Figure 11B:
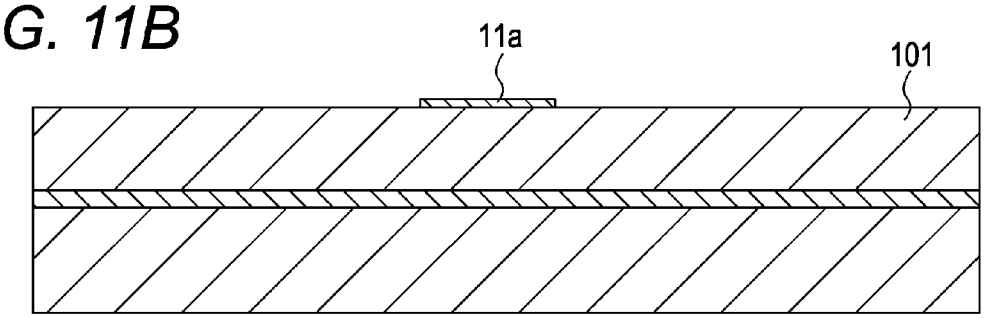

As shown in FIG. 11B, the mirror surface 11a is formed on the silicon layer 101. In forming the mirror surface 11a, for example, Cr (50 nm) is deposited on the silicon layer 101 by sputtering. Then Au (200 nm) is deposited on the silicon layer 101 on which Cr is already deposited by the sputtering. Then the mirror surface 11a is patterned to the Cr film and Au film serving as a metallic film through a predetermined mask by sequentially performing an etching process. For example, a potassium iodide-iodine aqueous solution can be used as an etching solution for Au. For example, a ceric ammonium nitrate aqueous solution can be used as an etching solution for Cr.

Figure 11C:
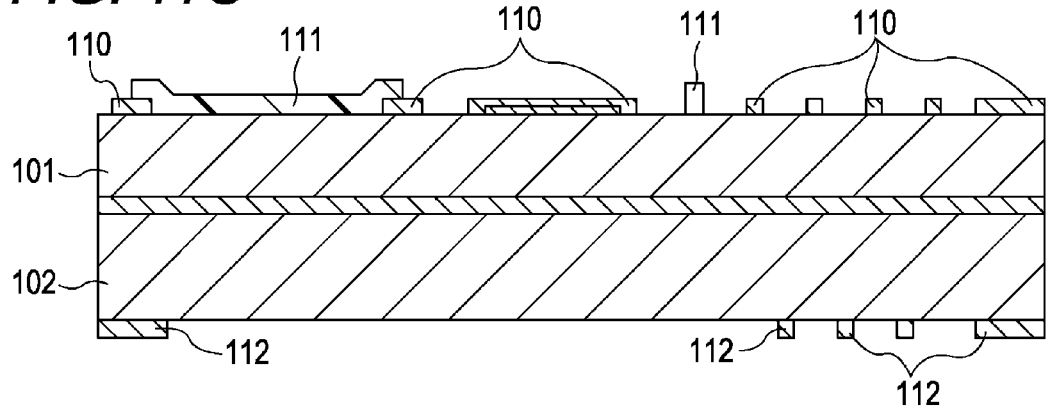
Figure 13:
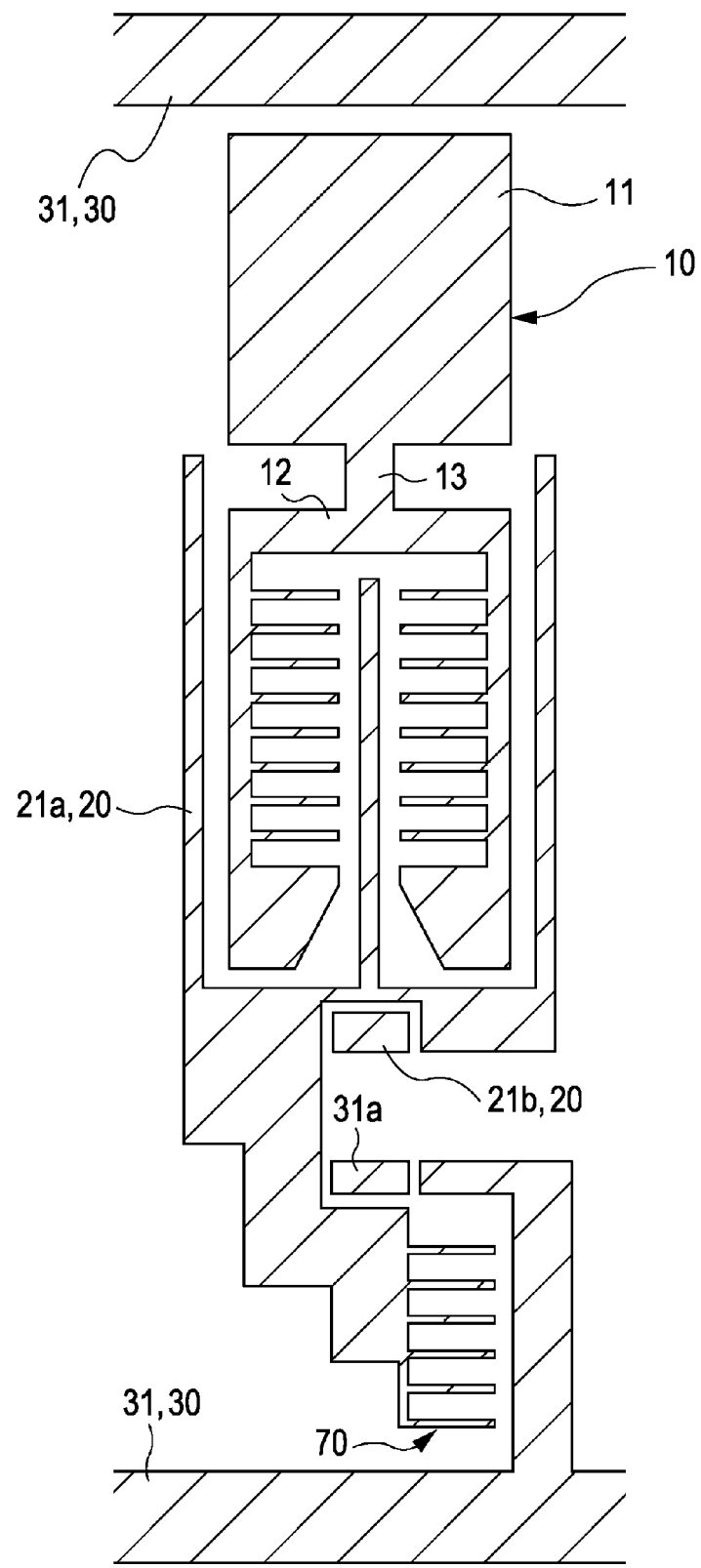
FIG. 13 is a plan view illustrating a mask pattern of the embodiment.
Figure 14:
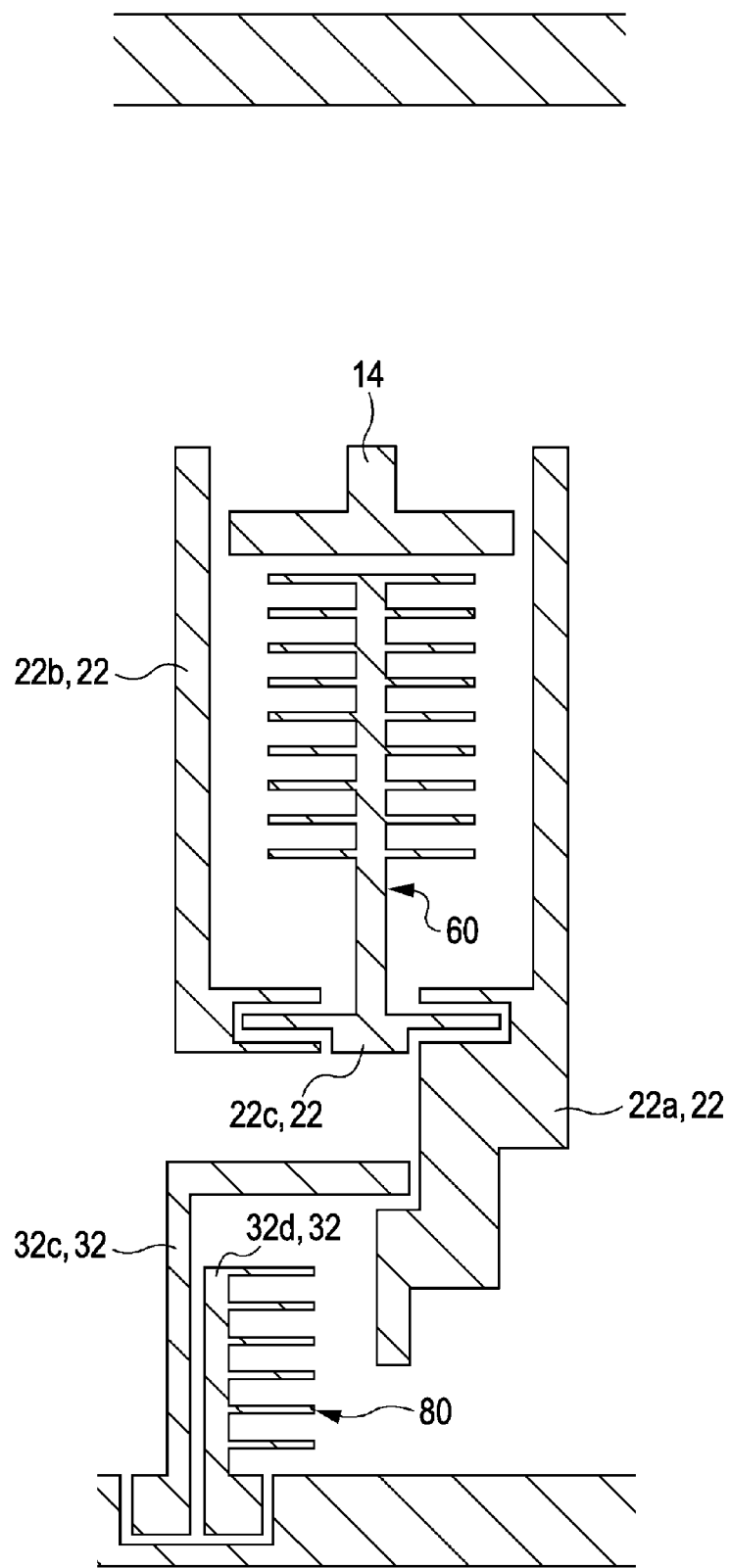
FIG. 14 is a plan view illustrating another mask pattern.

Then, as shown in FIG. 11C, an oxide film pattern 110 and a resist pattern 111 are formed on the silicon layer 101. On the other hand, an oxide film pattern 112 is formed on the silicon layer 102. The oxide film pattern 110 has a pattern shape corresponding to a part (including the land portion 11, electrode portion 12, and beam portion 13) of the oscillating portion 10, the first layer portion 21a of the frame 20, the first layer portion 31 (including the portion 31a) of the frame 30, and the electrode portion 70, which are formed in the silicon layer 101. FIG. 13 illustrates the pattern shape. The resist pattern 111 has a pattern shape corresponding to the coupling portions 40, 50A, and 50B. The oxide film pattern 112 has a pattern shape corresponding to the shield portion 14 of the oscillating portion 10, the second layer portion 22 of the frame 20, the second layer portion 32 of the frame 30, and the electrode portions 60 and 80, which are formed in the silicon layer 102. FIG. 14 illustrates the pattern shape.

Figure 11D:
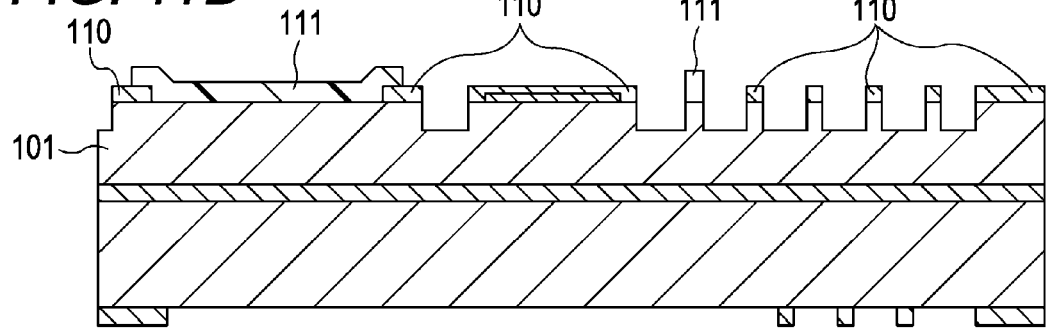

As shown in FIG. 11D, an etching process is performed up to a predetermined depth of the silicon layer 101 by DRIE (Deep Reactive Ion Etching) using the oxide film pattern 110 and resist pattern 111 as a mask. The predetermined depth shall mean a depth corresponding to the thicknesses of the coupling portions C1 and C2, for example, 5 μm. A Bosch process in which the etching performed using a $SF_6$ gas and a sidewall protection performed with a $C_4F_8$ gas are alternately repeated is used in DRIE. Good anisotropic etching processing can be performed using the Bosch process. The Bosch process can be adopted in the later-mentioned DRIE.

Figure 12A:
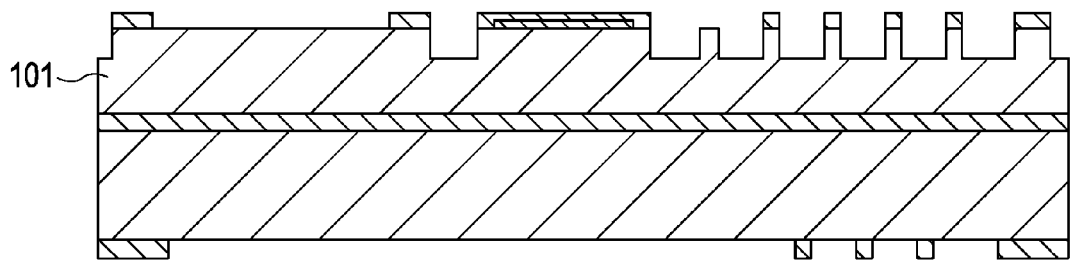
FIGS. 12A to 12D are sectional views illustrating a production process subsequent to the production process of FIG. 11D.

Then, as shown in FIG. 12A, the resist pattern 111 is removed. For example, the resist pattern 111 can be stripped using a stripping solution.

Figure 12B:
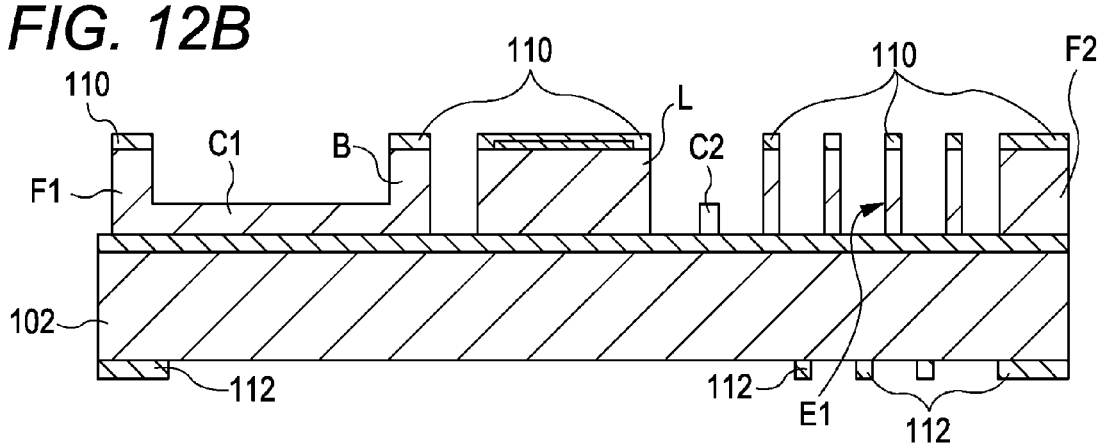

Then, as shown in FIG. 12B, using the oxide film pattern 110 as the mask, the etching process down to the insulating layer 103 is performed to the silicon layer 101 by DRIE while the coupling portions C1 and C2 are left. The land portion L, the beam portion B, the electrode E1, a part of the frame F1 (the first layer portion 21 of the frame 20), a part of the frame F3 (the first layer portion 31 of the frame 30), and the coupling portions C1 and C2 are formed through the process of FIG. 12B.

Figure 12C:
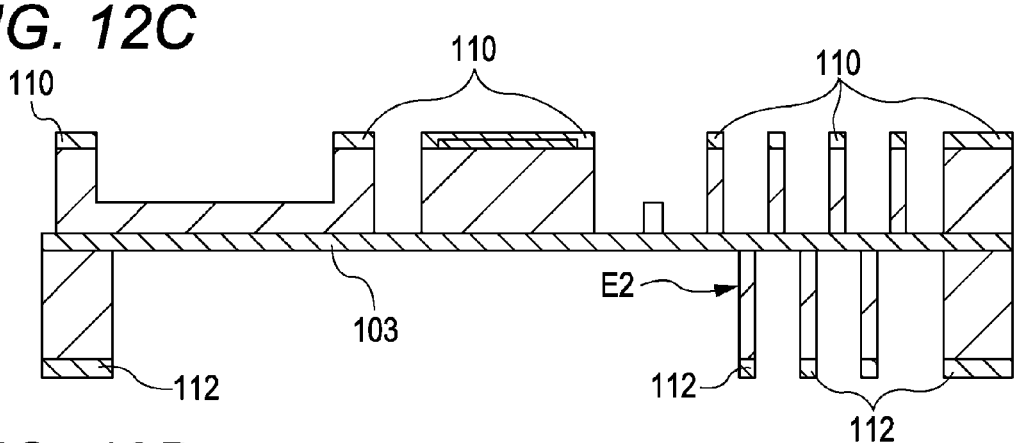

Then, as shown in FIG. 12C, using the oxide film pattern 112 as the mask, the etching process down to the insulating layer 103 is performed to the silicon layer 102 by DRIE. A part of the frame F1 (the second layer portion 22 of the frame 20), a part of the frame F2 (the second layer portion 32 of the frame 30), and the electrode E2 are formed through the process of FIG. 12C.

Figure 12D:
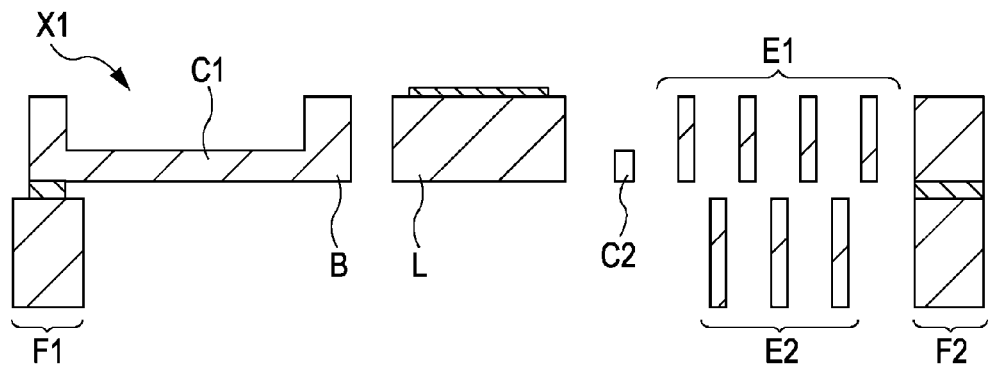

Then, as shown in FIG. 12D, an exposed point of the insulating layer 103 and the oxide film patterns 110 and 112 are removed by the etching. Dry etching or wet etching is adopted as the etching technique. For example, $CF_4$ or $CHF_3$ is used as the etching gas in cases where the dry etching is adopted. For example, a Buffered HydroFluoric acid (BHF) containing a hydrofluoric acid and an ammonium fluoride is used as the etching solution in cases where the wet etching is adopted.

Thus, the micro oscillating device X1 in which the land portion L, the beam portion B, the frames F1 and F2, the coupling portions C1 and C2, and the set of electrodes E1 and E2 are formed can be produced through the series of processes.

The micro oscillating device X1 may further include a support beam 42 that tentatively fixes the oscillating portion 10 to the frame 30. As shown by a broken line of FIG. 2, the support beam 42 couples the oscillating portion 10 and the first layer portion 31 that is located opposite to the support base 30A in the frame 30. The support beam 42 has a function of reinforcing the coupling between the oscillating portion 10 and the frame 20 with the pair of coupling portions 40 or the coupling between the movable portion (including the oscillating portion 10 and the frame 20) and the frame 30 with the pair of coupling portions 50. The support beam 42 is cut by a laser beam or the like before the micro oscillating device X1 is driven or used.

Figure 15:
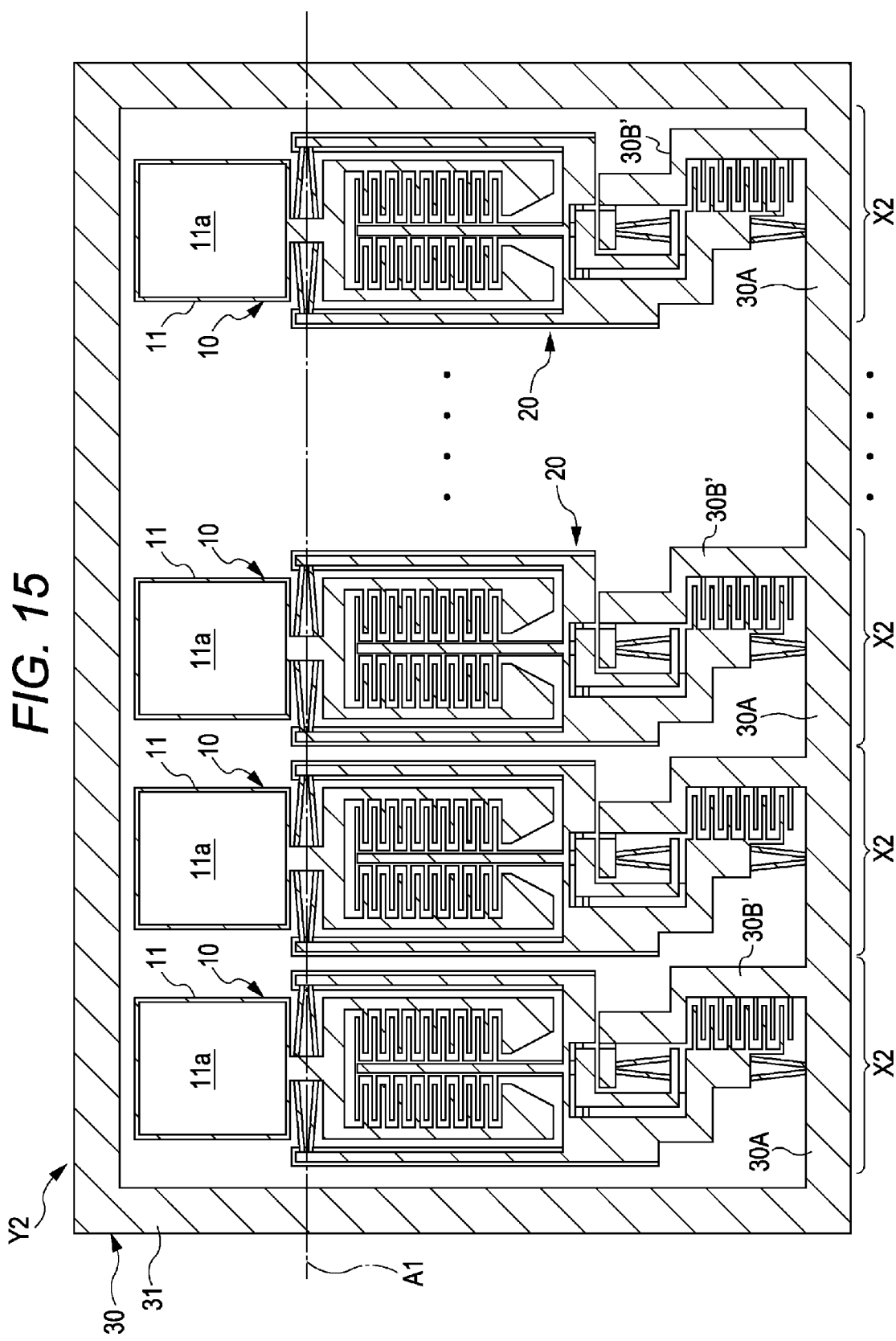
FIG. 15 is a plan view illustrating a micro oscillating device array according to a second embodiment.

FIG. 15 is a plan view illustrating a micro oscillating device array Y2 according to a second embodiment. The micro oscillating device array Y2 includes plural micro oscillating devices X2.

Figure 16:
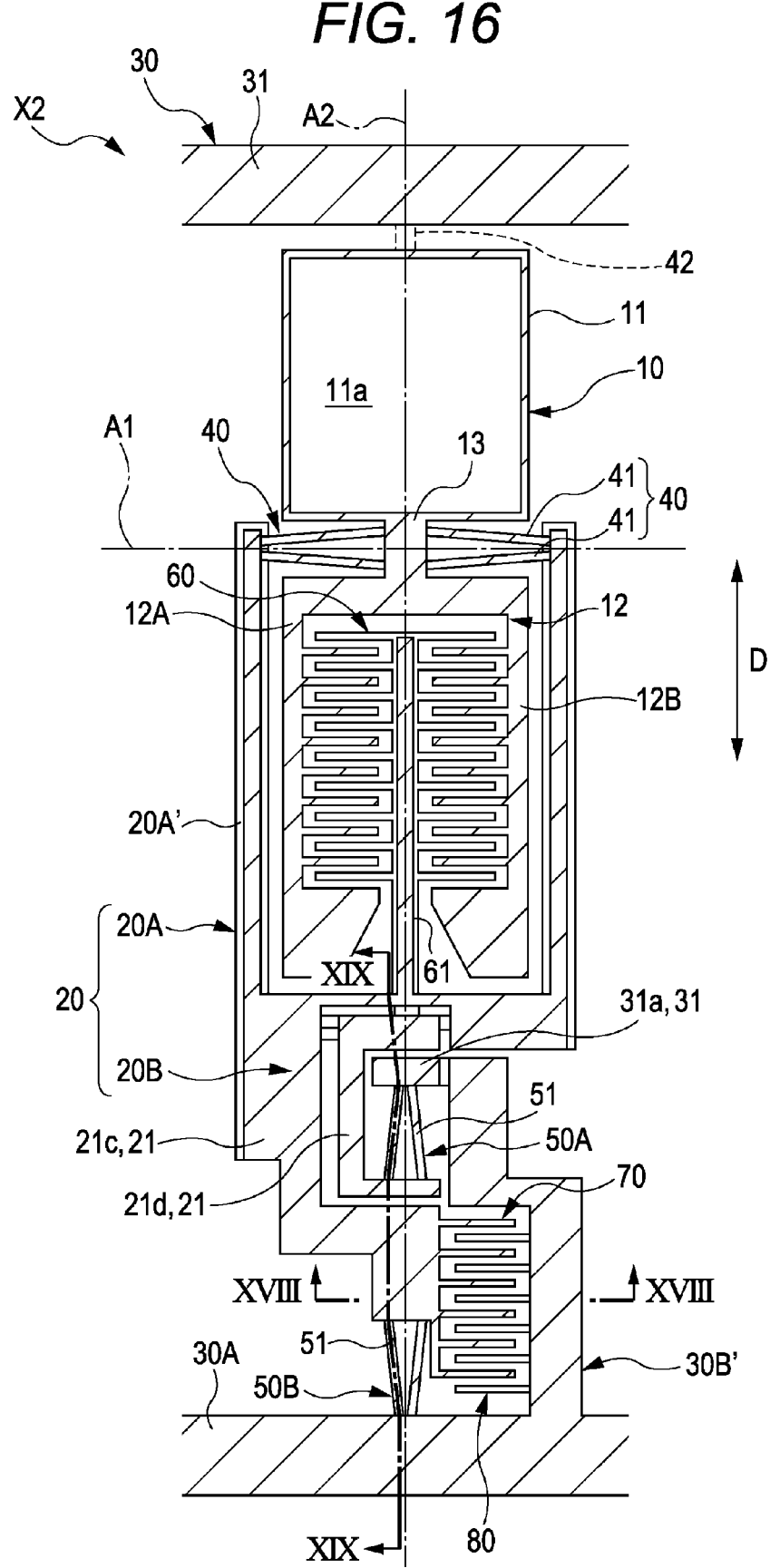
FIG. 16 is a plan view illustrating a micro oscillating device included in the micro oscillating device array of the second embodiment.
Figure 18:
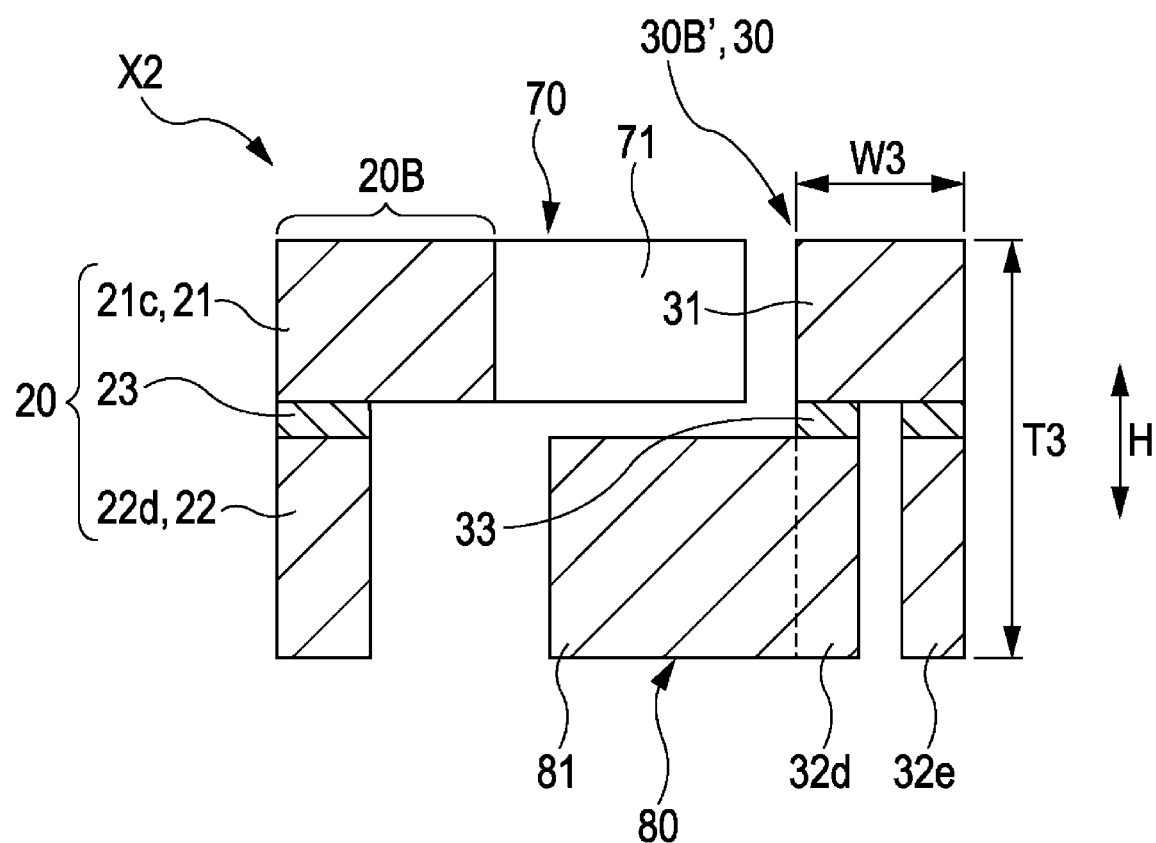
FIG. 18 is a sectional view taken on a line XVIII-XVIII of FIG. 16.
Figure 19:
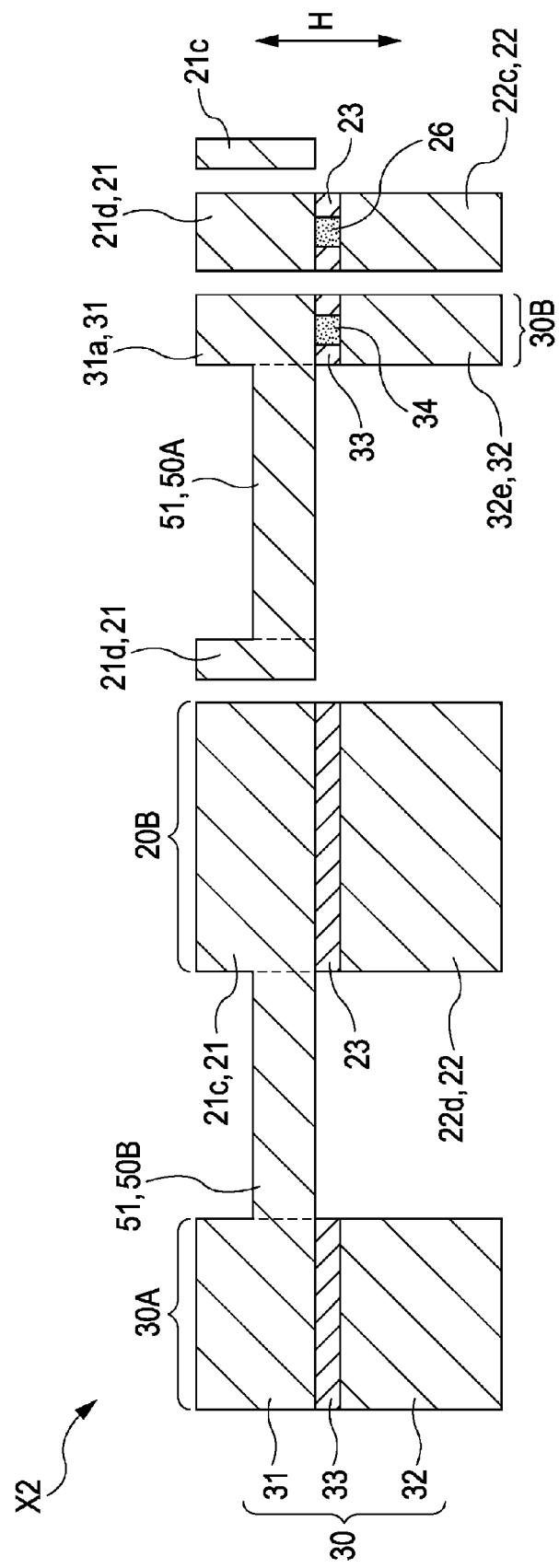
FIG. 19 is a sectional view taken on a line XIX-XIX of FIG. 16.

FIGS. 16 to 19 illustrate the micro oscillating device X2 included in the micro oscillating device array Y2. FIG. 16 is a plan view of the micro oscillating device X2. FIG. 17 is a plan view partially illustrating the micro oscillating device X2. FIGS. 18 and 19 are sectional views taken on a line XVIII-XVIII and a line XIX-XIX of FIG. 16, respectively.

The micro oscillating device X2 includes the oscillating portion 10, the frame 20, the frame 30, the pair of coupling portions 40, the pair of coupling portions 50A and 50B, and the electrode portions 60, 70, and 80. In the second embodiment, for example, the micro oscillating device X2 is applied to the micro mirror device. Similarly to the micro oscillating device X1, the micro oscillating device X2 is produced by processing the material substrate that is the SOI wafer using the bulk micromachining technique such as the MEMS technique. The material substrate has the laminated structure including the first silicon layer, the second silicon layer, and the insulating layer between the first and second silicon layers. The conductive property is imparted to the first and second silicon layers by doping an impurity. Each region included in the micro oscillating device X2 is formed while mainly derived from the first silicon layer or the second silicon layer. For the purpose of clarification of the drawing, the region that is derived from the first silicon layer and projected toward the near side of the paper plane from the insulating layer is drawn by hatching in FIG. 16. The structure of FIG. 17 is derived from the second silicon layer in the micro oscillating device X2.

The micro oscillating device X2 differs from the micro oscillating device X1 of the first embodiment in parts of the structures of the frames 20 and 30. Other structures of the micro oscillating device X2 are similar to those of the micro oscillating device X1.

The frame 20 of the second embodiment differs from the frame 20 of the first embodiment in a shape of the extended shape portion 20B. Further, the frame 20 of the second embodiment differs from the frame 20 of the first embodiment in that the first layer portion 21 is formed by portions 21c and 21d instead of the portions 21a and 21b and the second layer portion 22 includes a portion 22d instead of the portion 21a. In the second embodiment, the portion 21c of the frame 20 constitutes parts of the surrounding shape portion 20A and extended shape portion 20B. The portion 21c of the frame 20 of the second embodiment differs from the portion 21a of the first embodiment in the shape of the extended shape portion 20B. The portion 21d constitutes parts of the surrounding shape portion 20A and extended shape portion 20B. The portion 21d differs from the portion 21b of the first embodiment in that the portion 21d also constitutes a part of the extended shape portion 20B. As shown in FIG. 19, the portion 21d is electrically connected to the portion 22c of the second layer portion 22 through the via 26 pierced through the insulating layer 23. The portion 22d that constitutes parts of the surrounding shape portion 20A and extended shape portion 20B differs from the portion 22a of the first embodiment in the shape of the extended shape portion 20B. In the frame 20 of the second embodiment, other configurations are similar to those of the frame 20 of the first embodiment.

The frame 30 of the second embodiment differs from the frame 30 of the first embodiment in that the frame 30 of the second embodiment includes an arm 30B' instead of the arm 30B. As shown in FIG. 16, the arm 30B' is extended from the support base 30A toward the movable portion or the oscillating portion 10, and is bent in midstream. As shown in FIG. 18, a part of the arm 30B' has the aspect ratio in which a length T3 in the thickness direction H is divided by a width W3 is larger than one. That is, the arm 30B' has a region whose width is smaller than the length in the thickness direction H. The configuration is suitable for ensuring the bending strengths in the thickness direction H (mechanical strength to the load applied in the thickness direction H) of the arm 30B' and device. As shown in FIG. 16, the arm 30B' differs from the arm 30B of the first embodiment in a part of the shape of the first layer portion 31 of the arm 30. As shown in FIG. 17, the arm 30B' also differs from the arm 30B of the first embodiment in that the second layer portion 32 includes a portion 32e instead of the portion 32c. As shown in FIG. 19, the portion 32e is electrically connected to the portion 31a of the first layer portion 31 through the via 34 pierced through the insulating layer 33. In the arm 30B' of the second embodiment, other configurations are similar to those of the arm 30B of the first embodiment. The frame 30 of the second embodiment has the same configuration as the frame 30 of the first embodiment.

As shown in FIG. 16, each coupling portion 40 of the second embodiment is connected to the beam portion 13 of the oscillating portion 10 and the portion 21c of the first layer portion 21 of the frame 20. Therefore, the oscillating portion 10 and the frame 20 are coupled to each other. The beam portion 13 and the portion 22c are electrically connected through the coupling portion 40.

As shown in FIG. 19, the coupling portion 50A of the second embodiment is connected to the portion 21d of the first layer portion 21 of the frame 20 and the portion 31a of the first layer portion 31 in the arm 30B' of the frame 30. Therefore, the portion 21d and the portion 31a are coupled to each other. The portions 21d and 31a are electrically connected through the coupling portion 50A.

The coupling portion 50B of the second embodiment is connected to the portion 21c of the first layer portion 21 of the frame 20 and the first layer portion 31 in the support base 30A of the frame 30. Therefore, the portion 21c and the first layer portion 31 are coupled to each other. The portion 21c and a part of the first layer portion 31 of the support base 30A are electrically connected through the coupling portion 50B.

As shown in FIG. 17, the electrode portion 60 of the second embodiment includes the arm 61, the plural electrode teeth 62a, and the plural electrode teeth 62b. The arm 61 is extended from the portion 22c of the second layer portion 22 of the frame 20.

The electrode portion 70 of the second embodiment includes the plural electrode teeth 71. As shown in FIGS. 16 and 18, the plural electrode teeth 71 are extended toward the electrode portion 80 from the portion 21c of the first layer portion 21 of the frame 20. While separated from one another, the plural electrode teeth 71 are arrayed in the direction in which the shaft center A2 is extended.

The electrode portion 80 of the second embodiment includes plural electrode teeth 81. As shown in FIGS. 17 and 18, the plural electrode teeth 81 are extended toward the electrode portion 70 from the portion 32d of the second layer portion 32 in the arm 30B'. While separated from one another, the plural electrode teeth 81 are arranged in the direction in which the shaft center A2 is extended.

In driving the micro oscillating device X2, the reference potential is imparted to the electrode portion 12 of the oscillating portion 10 and the electrode portion 70. The reference potential is imparted to the electrode portion 12 through a part of the first layer portion 31 of the frame 30, the torsion bars 51 of the coupling portion 50B, the portion 21c of the first layer portion 21 of the frame 20, the torsion bars 41 of the coupling portion 40, and the beam portion 13 of the oscillating portion 10. The reference potential is imparted to the electrode portion 70 through a part of the first layer portion 31 of the frame 30, the torsion bars 51 of the coupling portion 50B, and the portion 21c of the first layer portion 21 of the frame 20. Preferably the reference potential is kept constant. For example, the ground potential is used as the reference potential.

In the micro oscillating device X2, the drive potential that is higher than the reference potential is imparted to the electrode portion 60 as needed, thereby generating the electrostatic attractive force between the electrode portions 12 and 60 to rotate the oscillating portion 10 about the shaft center A1. At the same time, in the micro oscillating device X2, the drive potential that is higher than the reference potential is imparted to the electrode portion 80 as needed, thereby generating the electrostatic attractive force between the electrode portions 70 and 80 to rotate the frame 20 and the oscillating portion 10 about the shaft center A2. The micro oscillating device X2 is the two-shaft oscillating device. The drive potential is imparted to the electrode portion 60 through the portion 32a of the second layer portion 32 in the support base 30A of the frame 30, the portion 32e of the second layer portion 32 in the arm 30B, the conductive via 34 on the portion 32e, the portion 31a of the first layer portion 31 on the conductive via 34, the torsion bars 51 of the coupling portion 50A, the portion 21d of the first layer portion 21 in the frame 20, the conductive via 26 on the portion 21, and the portion 22c of the second layer portion 22 on the conductive via 26. The drive potential is imparted to the electrode portion 80 through the portion 32b of the second layer portion 32 in the support base 30A of the frame 30 and the portion 32d of the second layer portion 32 in the arm 30B'. The direction of the light reflected from the mirror surface 11a on the land portion 11 of the oscillating portion 10 in the micro oscillating device X2 can be switched by the two-shaft oscillation drive.

The micro oscillating device array Y2 includes the plural micro oscillating devices X2 having the above-described configurations. In the micro oscillating device array Y2, the plural micro oscillating devices X2 are arranged in line such that all the shaft centers A2 (not shown in FIG. 15) are in parallel with one another.

In the micro oscillating device array Y2, the frames 30 of the micro oscillating devices X2 are integrated to form the frame body. The frames 30 surround all the movable portions including the oscillating portions 10 and the frames 20 in the micro oscillating devices X2. The first layer portion 31 of the frame 30 is continuously formed in all the micro oscillating devices X2 except for the portions 31a. Accordingly, the electrode portion 12 and shield portion 14 of the oscillating portion 10, the portion 21c of the first layer portion 21 and the portions 22b and 22d of the second layer portion 22 of the frame 20, and the electrode portion 70 are electrically connected in all the micro oscillating devices X2.

In driving the micro oscillating device array Y2, the reference potential is commonly imparted to the electrode portion 12 of the oscillating portions 10 and the electrode portions 70 in all the micro oscillating devices X2. At this point, the drive potentials are imparted to the electrode portions 60 and 80 of the selected micro oscillating device X2, respectively. Therefore, the oscillating portion 10 and frame 20 of each micro oscillating device X2 are individually oscillated to switch the direction of the light reflected from the mirror surface 11a on the land portion 11 in the oscillating portion 10 of the micro oscillating device X2.

Each micro oscillating device X2 included in the micro oscillating device array Y2 is the two-shaft oscillating device. As described above, each micro oscillating device X2 includes the oscillating portion 10, the frame 20 coupled to the oscillating portion 10, and the frame 30 coupled to the frame 20. In each micro oscillating device X2, the frames 20 and 30 are coupled between the support base 30A of the frame 30 and the oscillating portion 10 by the coupling portions 50A and 50B. Specifically, the coupling portion 50A (two torsion bars 51) that couples the frames 20 and 30 is connected to the frame 20 and the arm 30B' between the oscillating portion 10 and the support base 30A. The coupling portion 50B (two torsion bars 51) is connected to the frame 20 and the support base 30A between the oscillating portion 10 and the support base 30A. That is, in each micro oscillating device X2, the movable portion including the oscillating portion 10 and frame 20 is supported by the support base 30A of the frame 30 with the coupling portions 50A and 50B and the arm 30B' interposed therebetween.

In each micro oscillating device X2 in which the frame 30 supports the movable portion based on the cantilever structure, the oscillating portion 10 is not located between the pair of coupling portions 50A and 50B that couples the frames 20 and 30, so that the frame 20 can adopt the structure in which the land portion 11 of the oscillating portion 10 is not surrounded for the same reason as the micro oscillating device X1 of the first embodiment. Therefore, in the micro oscillating device array Y2, the land portions 11 of the oscillating portions 10 can sufficiently be brought close to each other in the adjacent micro oscillating devices X2 for the same reason as the micro oscillating device array Y1 of the first embodiment. In the micro oscillating device array Y2, the sufficiently high occupied ratio of the land portion 11 and mirror surface 11a can be realized in the direction in which the devices are arrayed. As the occupied ratio of the land portion 11 and mirror surface 11a is increased, the signal loss of the light reflected from each mirror surface 11a can be reduced in the whole of the micro oscillating device array Y2.

The electrode portion 12 of the oscillating portion 10, the shield portion 14, and the portions 22a and 22b of the second layer portion 22 of the frame 20 are electrically connected in each micro oscillating device X2 of the micro oscillating device array Y2, so that the reference potential (for example, the ground potential) is imparted not only to the electrode portion 12 but also to the shield portion 14 and the portions 22b and 22d in driving the device. Therefore, the electric field is easily absorbed by the shield portion 14. The electric field is caused by the predetermined drive potential that is higher than the reference potential, and is generated from the electrode portion 60 toward the land portion 11 of the oscillating portion 10 in driving the device. At the same time, the portions 22b and 22d easily absorb the electric field generated from the electrode portion 60 in driving the device. The electric field absorption effects prevent or restrain the leakage of the electric field to the outside of the device in the micro oscillating device X2. The electric field leaking from the drive mechanism including the electrode portions 12 and 60 of one of the micro oscillating devices X2 in the micro oscillating device array Y2 can be prevented from adversely affecting the drive characteristic of the adjacent micro oscillating device X2 by the prevention or restraint of the leakage of the electric field to the outside of the device. Accordingly, the electric field absorption effects contribute to the greater density in the direction in which the micro oscillating devices X2 are arrayed and the high occupied ratio of the land portion 11 and mirror surface 11a in the direction in which the devices are arrayed.

In each micro oscillating device X2 of the micro oscillating device array Y2, similarly to the micro oscillating device X1, in the arm 20A' of the frame 20, the aspect ratio in which the length T1 in the thickness direction H is divided by the width W1 is larger than one. Therefore, the arm 20A' has the structure in which the bending strength in the thickness direction H is easy to ensure. At the same time, as described above with reference to FIG. 18, in the arm 30B' of the frame 30, the aspect ratio in which the length T3 in the thickness direction H is divided by the width W3 is larger than one. Therefore, the arm 30B' has the structure in which the bending strength in the thickness direction H is easy to ensure. In the micro oscillating device X2 in which the support base 30A of the frame 30 supports the movable portion by the cantilever structure, the configuration is suitable for ensuring the bending strength in the thickness direction H in the support structure between the oscillating portion 10 and the support base 30A.

The micro oscillating device X2 may be applied to sensing devices such as the angular velocity sensor and the acceleration sensor. In the micro oscillating device X2 applied to the sensing device, it is not always necessary to provide the mirror surface 11a on the land portion 11 of the oscillating portion 10. In cases where the micro oscillating device X2 is applied to the angular velocity sensor, the method for detecting the angular velocity with the micro oscillating device X2 is similar to the method for detecting the angular velocity with the micro oscillating device X1 of the first embodiment applied to the angular velocity sensor. In cases where the micro oscillating device X2 is applied to the acceleration sensor, the method for detecting the acceleration with the micro oscillating device X2 is similar to the method for detecting the acceleration with the micro oscillating device X1 of the first embodiment applied to the acceleration sensor.

Figure 20:
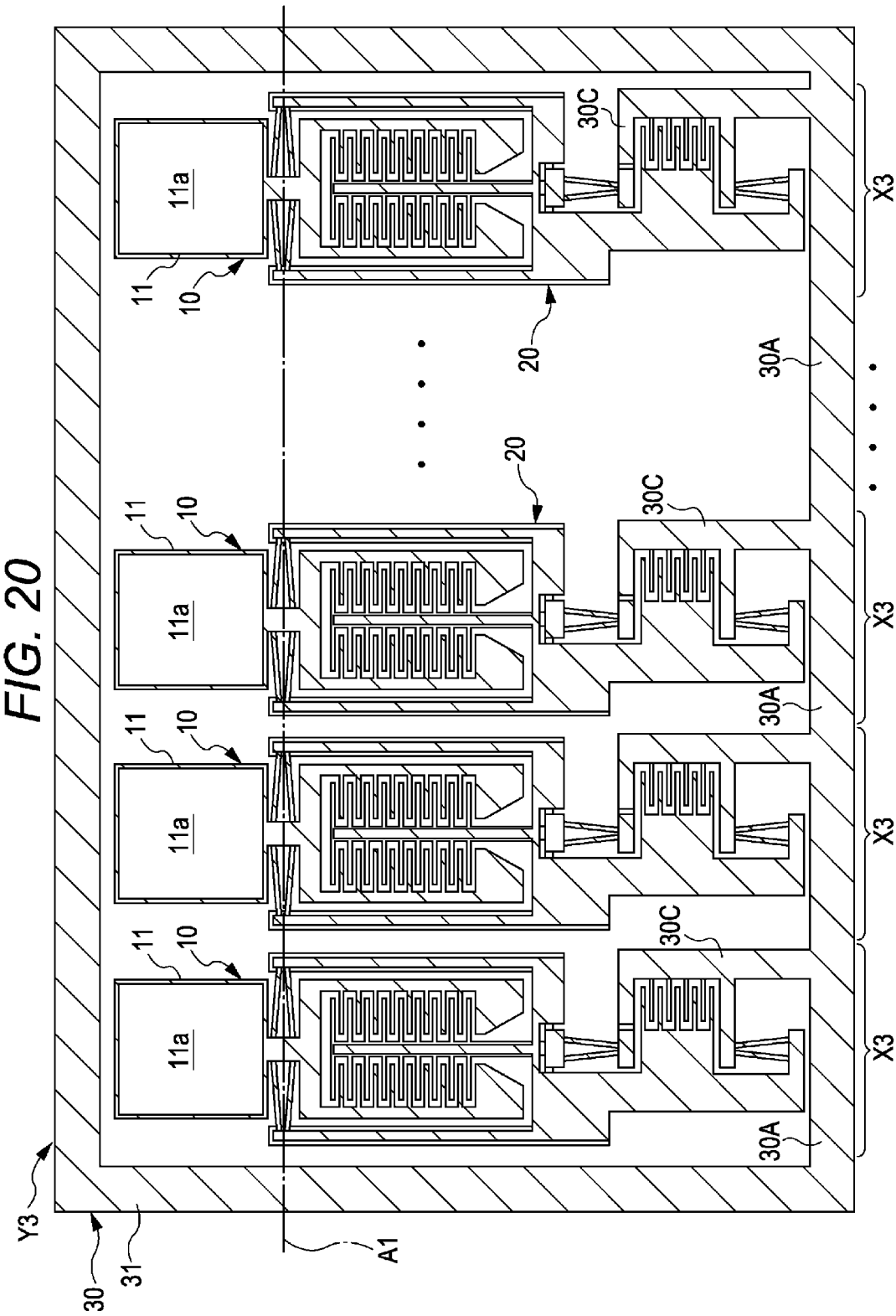
FIG. 20 is a plan view illustrating a micro oscillating device array according to a third embodiment.

FIG. 20 is a plan view illustrating a micro oscillating device array Y3 according to a third embodiment. The micro oscillating device array Y3 includes plural micro oscillating devices X3.

Figure 21:
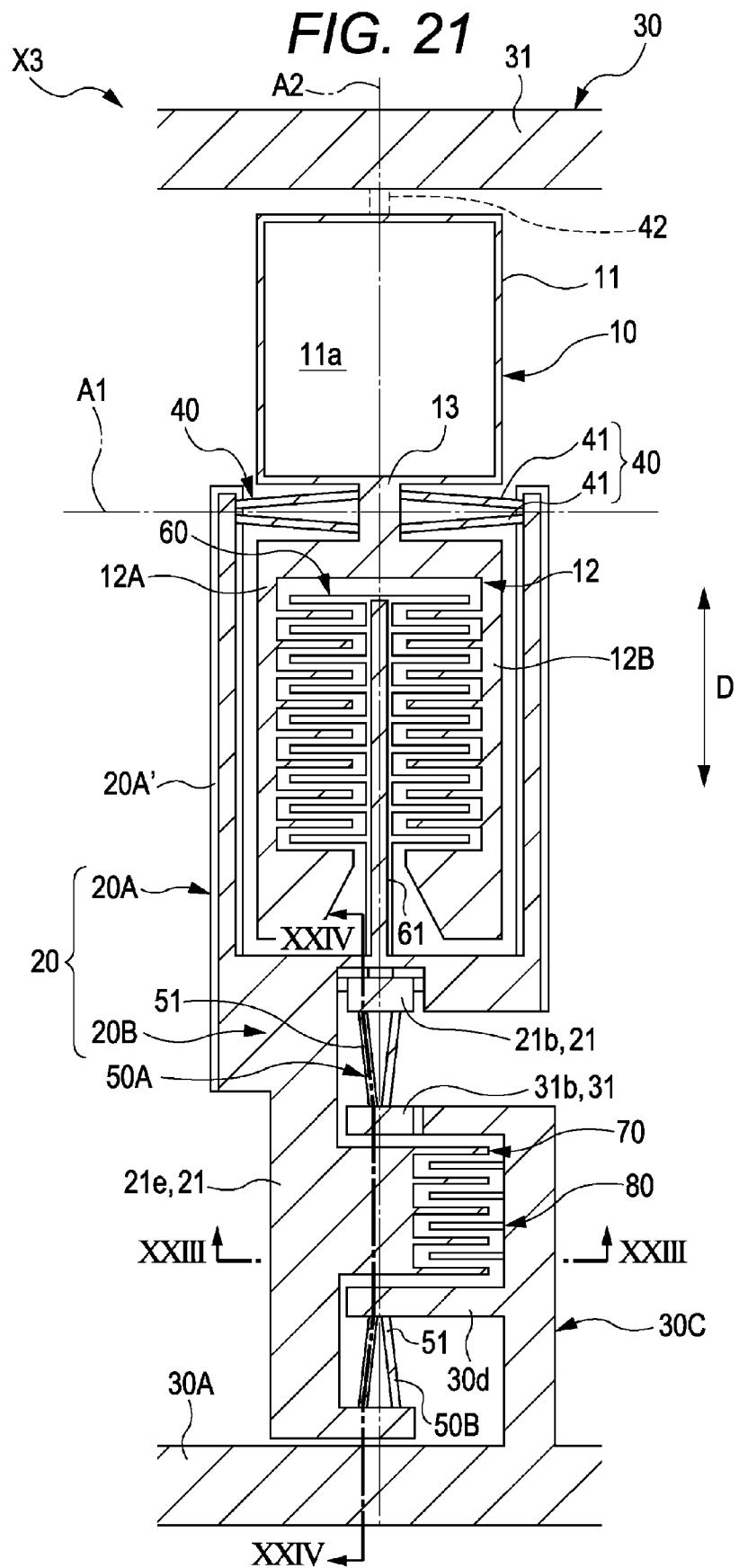
FIG. 21 is a plan view illustrating a micro oscillating device included in the micro oscillating device array of the third embodiment.
Figure 23:
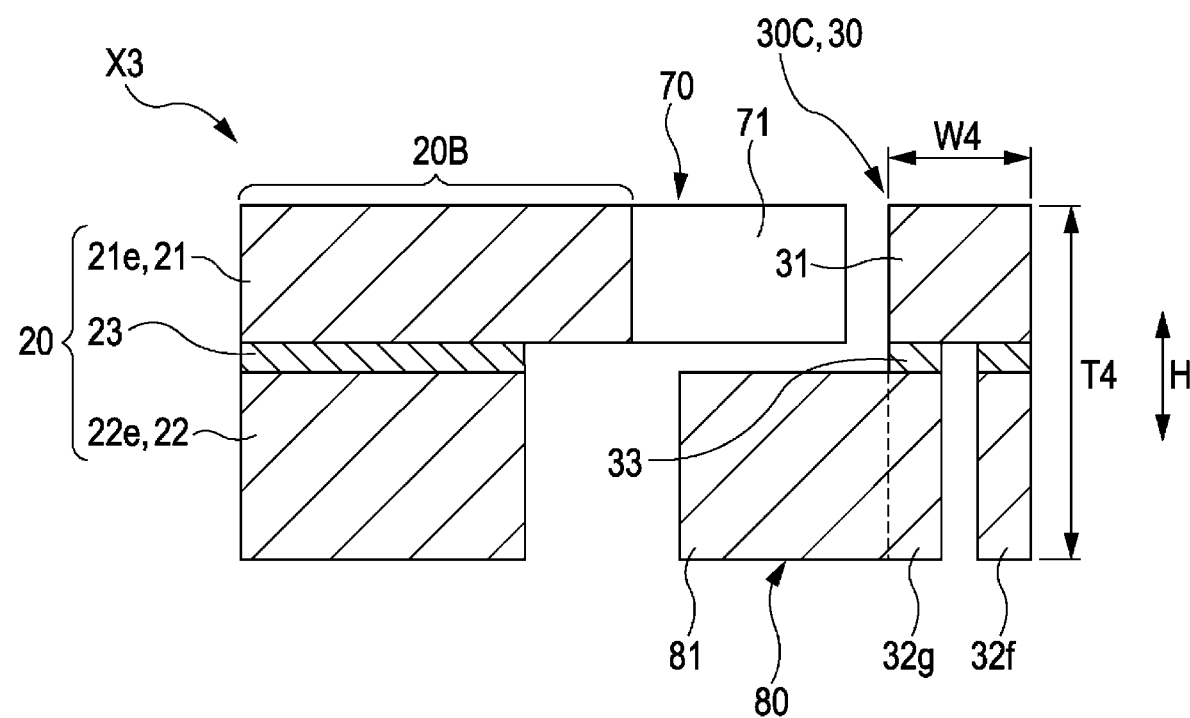
FIG. 23 is a sectional view taken on a line XXIII-XXIII of FIG. 21.
Figure 24:
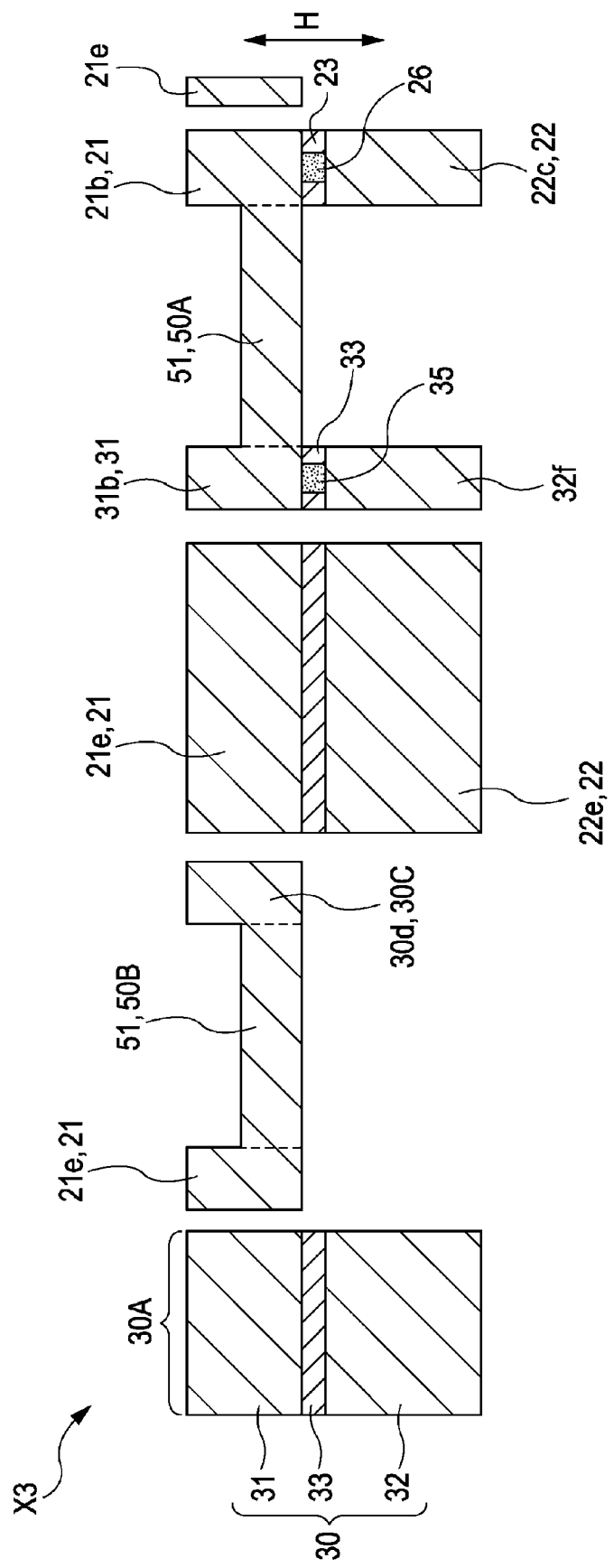
FIG. 24 is a sectional view taken on a line XXIV-XXIV of FIG. 21.

FIGS. 21 to 24 illustrate the micro oscillating device X3 included in the micro oscillating device array Y3. FIG. 21 is a plan view of the micro oscillating device X3. FIG. 22 is a plan view partially illustrating the micro oscillating device X3. FIGS. 23 and 24 are sectional views taken on a line XXIII-XXIII and a line XXIV-XXIV of FIG. 21, respectively.

The micro oscillating device X3 includes the oscillating portion 10, the frame 20, the frame 30, the pair of coupling portions 40, the pair of coupling portions 50A and 50B, and the electrode portions 60, 70, and 80. In the third embodiment, for example, the micro oscillating device X3 is applied to the micro mirror device. Similarly to the micro oscillating device X1, the micro oscillating device X3 is produced by processing the material substrate using the bulk micromachining technique such as the MEMS technique. For example, the SOI wafer is used as the material substrate. The material substrate has the laminated structure including the first silicon layer, the second silicon layer, and the insulating layer between the first and second silicon layers. The conductive property is imparted to the first and second silicon layers by doping an impurity. Each region included in the micro oscillating device X3 is formed while mainly derived from the first silicon layer or the second silicon layer. Accordingly, for the purpose of clarification of the drawing, the region that is derived from the first silicon layer and projected toward the near side of the paper plane from the insulating layer is drawn by hatching in FIG. 21. The structure of FIG. 22 is derived from the second silicon layer in the micro oscillating device X3.

The micro oscillating device X3 differs from the micro oscillating device X1 of the first embodiment in parts of the structures of the frames 20 and 30. Other structures of the micro oscillating device X3 are similar to those of the micro oscillating device X1.

The frame 20 of the third embodiment differs from the frame 20 of the first embodiment in a shape of the extended shape portion 20B. Further, the frame 20 of the third embodiment differs from the frame 20 of the first embodiment in that the first layer portion 21 includes a portion 21e instead of the portion 21a and the second layer portion 22 includes a portion 22e instead of the portion 22a. In the third embodiment, the portion 21e of the frame 20 constitutes parts of the surrounding shape portion 20A and extended shape portion 20B. The portion 22e of the second layer portion 22 of the third embodiment differs from the portion 21a of the first embodiment in the shape of the extended shape portion 20B. The portion 22e constitutes parts of the surrounding shape portion 20A and extended shape portion 20B. The portion 22e differs from the portion 22a of the first embodiment in the shape of the extended shape portion 20B. In the frame 20 of the third embodiment, other configurations are similar to those of the frame 20 of the first embodiment.

The frame 30 of the third embodiment differs from the frame 30 of the first embodiment in that the frame 30 of the third embodiment includes an arm 30C instead of the arm 30B. As shown in FIG. 21, the arm 30C is extended and bent from the support base 30A toward the movable portion or the oscillating portion 10. The arm 30C includes a branch portion 30d. As shown in FIG. 23, in a part of the arm 30C, the aspect ratio in which a length T4 in the thickness direction H is divided by a width W4 is larger than one. That is, the arm 30C has a region whose width is smaller than the length in the thickness direction H. The configuration is suitable for ensuring the bending strengths in the thickness direction H (mechanical strength to the load applied in the thickness direction H) of the arm 30C and device.

As shown in FIGS. 21 and 24, the arm 30C includes a portion 31b in the first layer portion 31. As shown in FIG. 22, the arm 30C includes portions 32f and 32g in the second layer portion 32, and the portions 32f and 32g are separated with a gap. The portion 32f is connected to the portion 32a of the support base 30A. The portion 32g is connected to the portion 32b of the support base 30A. As shown in FIG. 24, the portions 31b and 32f in the arm 30C are electrically connected through a conductive via 35 pierced through the insulating layer 33.

As shown in FIG. 21, each coupling portion 40 of the third embodiment is connected to the beam portion 13 of the oscillating portion 10 and the portion 21e of the first layer portion 21 of the frame 20. Therefore, the oscillating portion 10 and the frame 20 are coupled to each other. The beam portion 13 and the portion 21e are electrically connected through the coupling portion 40.

As shown in FIG. 24, the coupling portion 50A of the third embodiment is connected to the portion 21b of the first layer portion 21 of the frame 20 and the portion 31b of the first layer portion 31 in the arm 30C of the frame 30. Therefore, the frames 20 and 30 are coupled to each other. The portions 21b and 31b are electrically connected through the coupling portion 50A.

As shown in FIG. 24, the coupling portion 50B of the third embodiment is connected to the portion 21e of the first layer portion 21 of the frame 20 and the branch portion 30d of the arm 30C of the frame 30. Therefore, the frames 20 and 30 are coupled to each other. The portion 21e and the branch portion 30d are electrically connected through the coupling portion 50B.

As shown in FIG. 22, the electrode portion 60 of the third embodiment includes the arm 61, the plural electrode teeth 62a, and the plural electrode teeth 62b. The arm 61 is extended from the portion 22c of the second layer portion 22 of the frame 20.

The electrode portion 70 of the third embodiment includes the plural electrode teeth 71. As shown in FIGS. 21 and 23, the plural electrode teeth 71 are extended toward the electrode portion 80 from the portion 21e of the first layer portion 21 of the frame 20. While separated from one another, the plural electrode teeth 71 are arrayed in the direction in which the shaft center A2 is extended.

The electrode portion 80 of the third embodiment includes plural electrode teeth 81. As shown in FIGS. 22 and 23, the plural electrode teeth 81 are extended toward the electrode portion 70 from the portion 32g of the second layer portion 32 of the arm 30C. While separated from one another, the plural electrode teeth 81 are arranged in the direction in which the shaft center A2 is extended.

In driving the micro oscillating device X3, the reference potential is imparted to the electrode portion 12 of the oscillating portion 10 and the electrode portion 70. The reference potential is imparted to the electrode portion 12 through a part of the first layer portion 31 of the frame 30, the torsion bars 51 of the coupling portion 50B, the portion 21e of the first layer portion 21 of the frame 20, the torsion bars 41 of the coupling portion 40, and the beam portion 13 of the oscillating portion 10. The reference potential is imparted to the electrode portion 70 through a part of the first layer portion 31 of the frame 30, the torsion bars 51 of the coupling portion 50B, and the portion 21e of the first layer portion 21 of the frame 20. Preferably the reference potential is kept constant. For example, the ground potential is used as the reference potential.

In the micro oscillating device X3, the drive potential that is higher than the reference potential is imparted to the electrode portion 60 as needed, thereby generating the electrostatic attractive force between the electrode portions 12 and 60 to rotate the oscillating portion 10 about the shaft center A1. At the same time, in the micro oscillating device X3, the drive potential that is higher than the reference potential is imparted to the electrode portion 80 as needed, thereby generating the electrostatic attractive force between the electrode portions 70 and 80 to rotate the frame 20 and the oscillating portion 10 about the shaft center A2. The micro oscillating device X3 is the two-shaft oscillating device. The drive potential is imparted to the electrode portion 60 through the portion 32a of the second layer portion 32 in the support base 30A of the frame 30, the portion 32f of the second layer portion 32 in the arm 30C, the conductive via 35 on the portion 32f, the portion 31b of the first layer portion 31 on the conductive via 35, the torsion bars 51 of the coupling portion 50A, the portion 21b of the first layer portion 21 in the frame 20, the conductive via 26 on the portion 21b, and the portion 22c on the conductive via 26. The drive potential is imparted to the electrode portion 80 through the portion 32b of the second layer portion 32 in the support base 30A of the frame 30 and the portion 32g of the second layer portion 32 in the arm 30C.

The direction of the light reflected from the mirror surface 11a on the land portion 11 of the oscillating portion 10 in the micro oscillating device X3 can be switched by the two-shaft oscillation drive.

The micro oscillating device array Y3 includes the plural micro oscillating devices X3 having the above-described configurations. In the micro oscillating device array Y3, the plural micro oscillating devices X3 are arranged in line such that all the shaft centers A2 (not shown in FIG. 20) are in parallel with one another.

In the micro oscillating device array Y3, the frames 30 of the micro oscillating devices X3 are integrated to form the frame body. The frames 30 surround all the movable portions including the oscillating portions 10 and the frames 20 in the micro oscillating devices X3. The first layer portion 31 of the frame 30 is continuously formed in all the micro oscillating devices X3 except for the portions 31a. Accordingly, the electrode portion 12 and shield portion 14 of the oscillating portion 10, the portion 21e of the first layer portion 21 and the portions 22b and 22e of the second layer portion 22 of the frame 20, and the electrode portion 70 are electrically connected in all the micro oscillating devices X3.

In driving the micro oscillating device array Y3, the reference potential is commonly imparted to the electrode portion 12 of the oscillating portions 10 and the electrode portions 70 in all the micro oscillating devices X3. At this point, the drive potentials are imparted to the electrode portions 60 and 80 of the selected micro oscillating device X3, respectively. Therefore, the oscillating portion 10 and frame 20 of each micro oscillating device X3 are individually oscillated to switch the direction of the light reflected from the mirror surface 11a on the land portion 11 in the oscillating portion 10 of the micro oscillating device X3.

Each micro oscillating device X3 included in the micro oscillating device array Y3 is the two-shaft oscillating device. As described above, each micro oscillating device X3 includes the oscillating portion 10, the frame 20 coupled to the oscillating portion 10, and the frame 30 coupled to the frame 20. In each micro oscillating device X3, the frames 20 and 30 are coupled between the support base 30A of the frame 30 and the oscillating portion 10 by the coupling portions 50A and 50B. Specifically, the coupling portion 50A (two torsion bars 51) that couples the frames 20 and 30 is connected to the frame 20 and the arm 30C between the oscillating portion 10 and the support base 30A. The coupling portion 50B (two torsion bars 51) is connected to the frame 20 and the arm 30C (or the branch portion 33d) between the oscillating portion 10 and the support base 30A. That is, in each micro oscillating device X3, the movable portion including the oscillating portion 10 and frame 20 is supported by the support base 30A of the frame 30 with the coupling portions 50A and 50B and the arm 30C interposed therebetween.

In each micro oscillating device X3 in which the frame 30 supports the movable portion based on the cantilever structure, the oscillating portion 10 is not located between the pair of coupling portions 50A and 50B that couples the frames 20 and 30, so that the frame 20 can adopt the structure in which the land portion 11 of the oscillating portion 10 is not surrounded for the same reason as the micro oscillating device X1 of the first embodiment. Therefore, in the micro oscillating device array Y3, the land portions 11 of the oscillating portions 10 can sufficiently be brought close to each other in the adjacent micro oscillating devices X3 for the same reason as the micro oscillating device array Y1 of the first embodiment. In the micro oscillating device array Y3, the sufficiently high occupied ratio of the land portion 11 and mirror surface 11a can be realized in the direction in which the devices are arrayed. As the occupied ratio of the land portion 11 and mirror surface 11a in the device array direction is increased, the signal loss of the light reflected from each mirror surface 11a can be reduced in the whole of the micro oscillating device array Y3.

The electrode portion 12 of the oscillating portion 10, the shield portion 14, and the portions 22b and 22e of the second layer portion 22 of the frame 20 are electrically connected in each micro oscillating device X3 of the micro oscillating device array Y3, so that the reference potential (for example, the ground potential) is imparted not only to the electrode portion 12 but also to the shield portion 14 and the portions 22b and 22e in driving the device. Therefore, the electric field is easily absorbed by the shield portion 14. The electric field is caused by the predetermined drive potential that is higher than the reference potential, and is generated from the electrode portion 60 toward the land portion 11 of the oscillating portion 10 in driving the device. At the same time, the portions 22b and 22e easily absorb the electric field generated from the electrode portion 60 in driving the device. The electric field absorption effects prevent or restrain the leakage of the electric field to the outside of the device in the micro oscillating device X3. The electric field leaking from the drive mechanism including the electrode portions 12 and 60 of one of the micro oscillating devices X3 in the micro oscillating device array Y3 can be prevented from adversely affecting the drive characteristic of the adjacent micro oscillating device X3 by the prevention or restraint of the leakage of the electric field to the outside of the device. Accordingly, the electric field absorption effects contribute to the greater density in the direction in which the micro oscillating devices X3 are arrayed and the high occupied ratio of the land portion 11 and mirror surface 11a in the direction in which the devices are arrayed.

In each micro oscillating device X3 of the micro oscillating device array Y3, similarly to the micro oscillating device X1, in the arm 20A' of the frame 20, the aspect ratio in which the length T1 in the thickness direction H is divided by the width W1 is larger than one. Therefore, the arm 20A' of the frame 20 has the structure in which the bending strength in the thickness direction H is easy to ensure. At the same time, as described above with reference to FIG. 23, in the arm 30C of the frame 30, the aspect ratio in which the length T4 in the thickness direction H is divided by the width W4 is larger than one. Therefore, the arm 30C of the frame 30 has the structure in which the bending strength in the thickness direction H is easy to ensure. In the micro oscillating device X3 in which the support base 30A of the frame 30 supports the movable portion by the cantilever structure, the configuration is suitable for ensuring the bending strength in the thickness direction H in the support structure between the oscillating portion 10 and the support base 30A.

The micro oscillating device X3 may be applied to sensing devices such as the angular velocity sensor and the acceleration sensor. In the micro oscillating device X3 applied to the sensing device, it is not always necessary to provide the mirror surface 11a on the land portion 11 of the oscillating portion 10. In cases where the micro oscillating device X3 is applied to the angular velocity sensor, the method for detecting the angular velocity with the micro oscillating device X3 is similar to the method for detecting the angular velocity with the micro oscillating device X1 of the first embodiment applied to the angular velocity sensor. In cases where the micro oscillating device X3 is applied to the acceleration sensor, the method for detecting the acceleration with the micro oscillating device X3 is similar to the method for detecting the acceleration with the micro oscillating device X1 of the first embodiment applied to the acceleration sensor.

Figure 25:
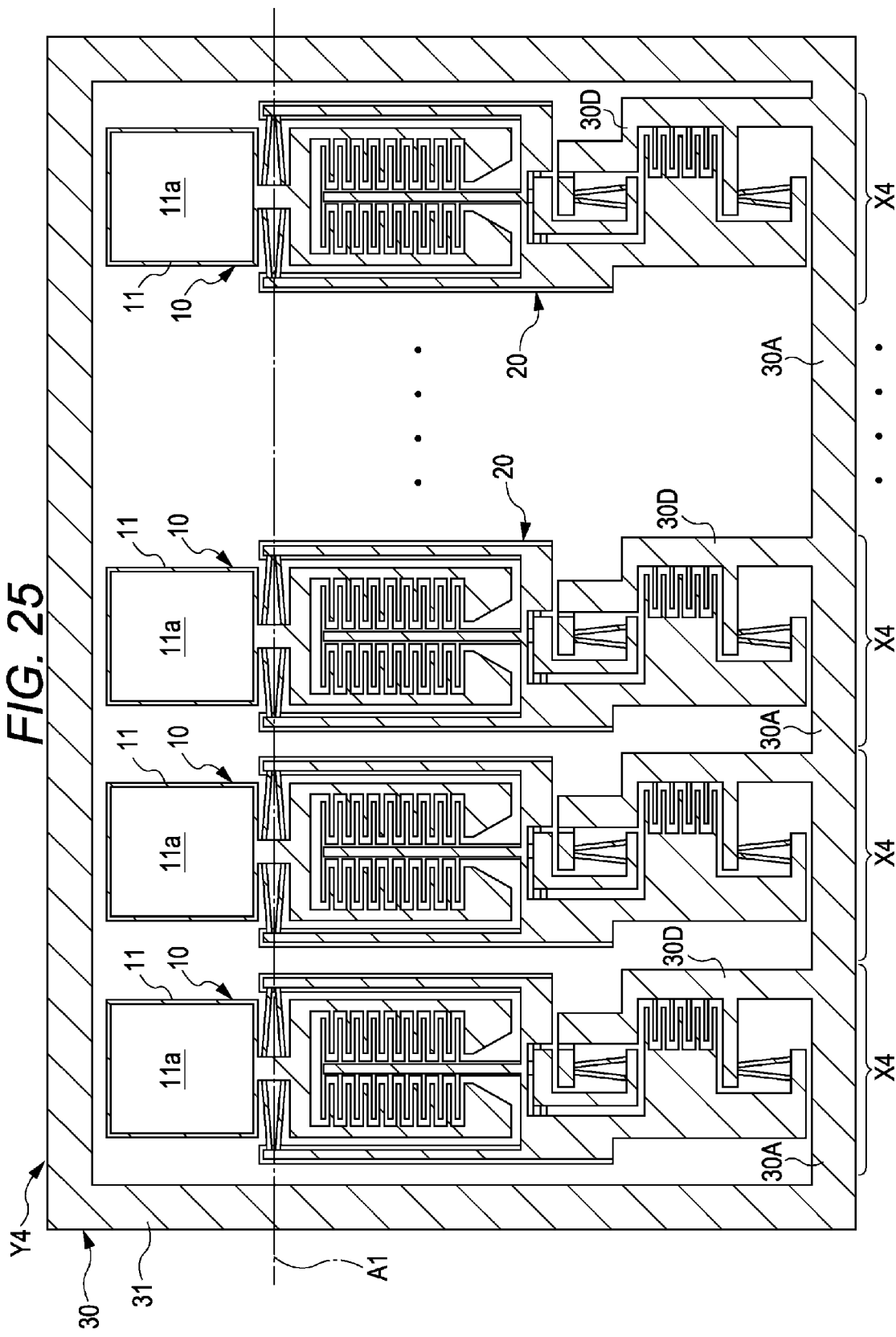
FIG. 25 is a plan view illustrating a micro oscillating device array according to a fourth embodiment.

FIG. 25 is a plan view illustrating a micro oscillating device array Y4 according to a fourth embodiment. The micro oscillating device array Y4 includes plural micro oscillating devices X4.

Figure 26:
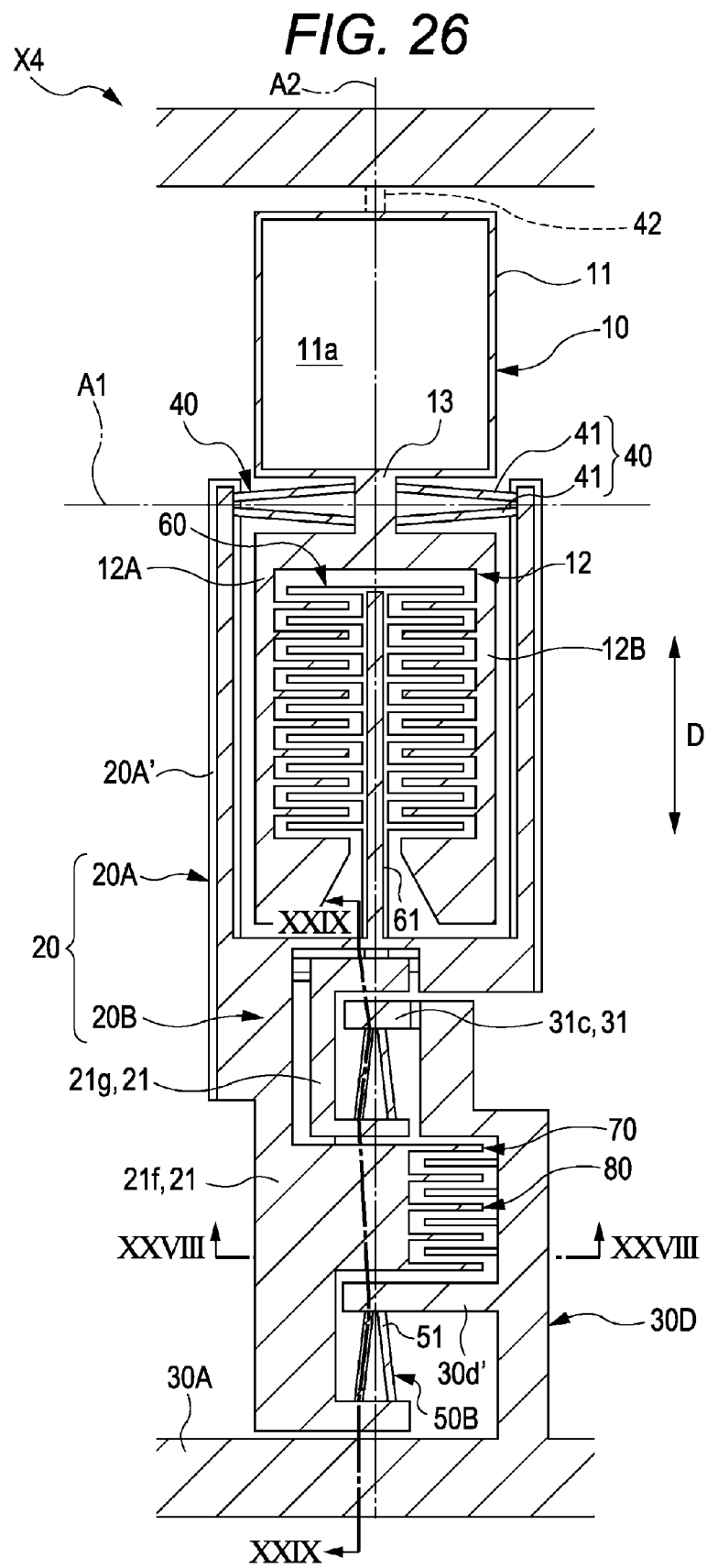
FIG. 26 is a plan view illustrating a micro oscillating device included in the micro oscillating device array of the fourth embodiment.
Figure 27:
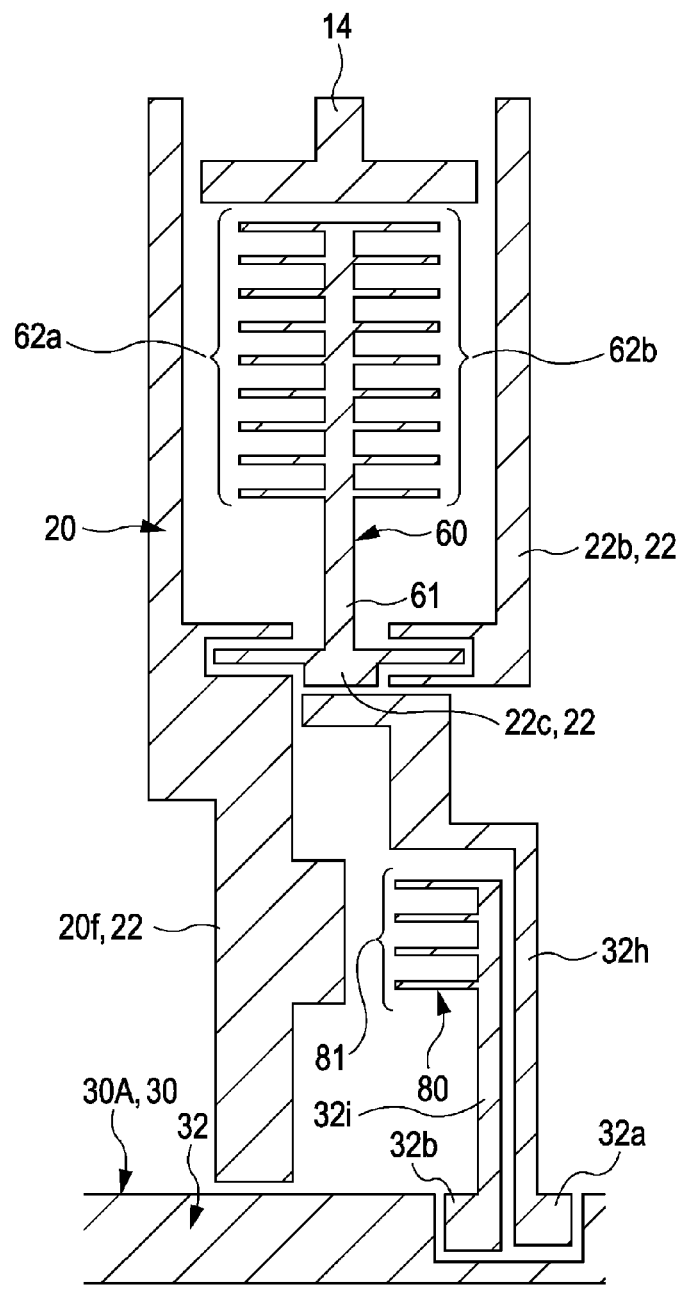
FIG. 27 is a plan view partially illustrating the micro oscillating device of the fourth embodiment.
Figure 28:
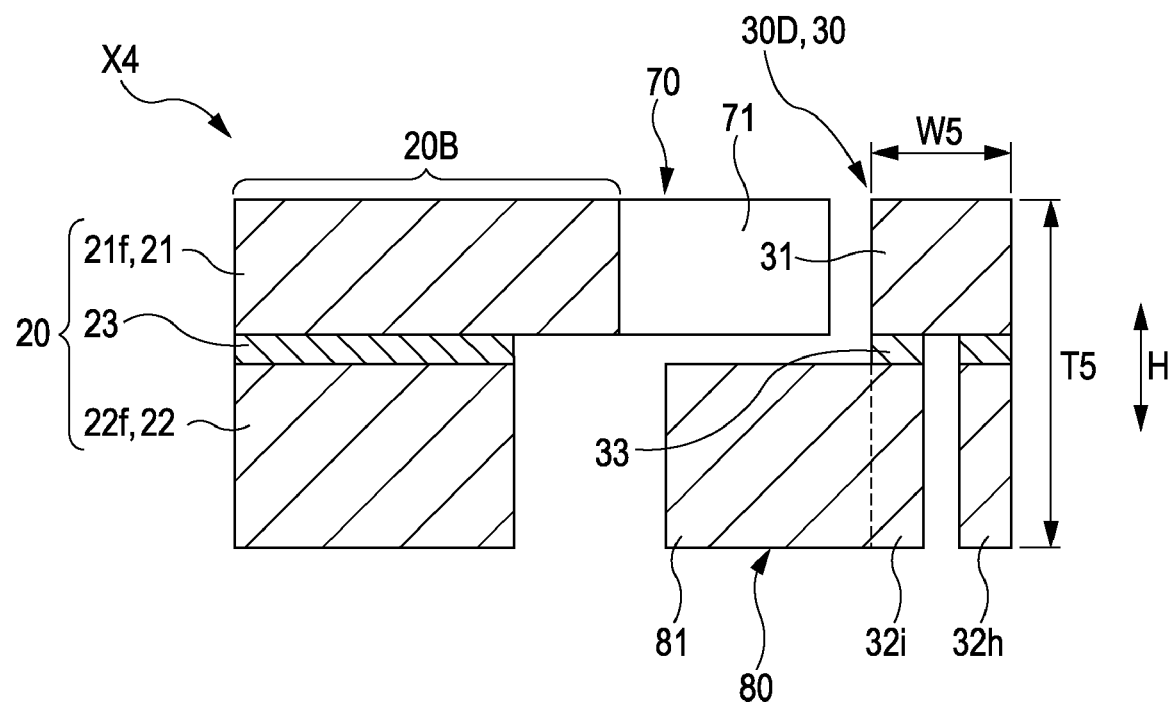
FIG. 28 is a sectional view taken on a line XXVIII-XXVIII of FIG. 26.
Figure 29:
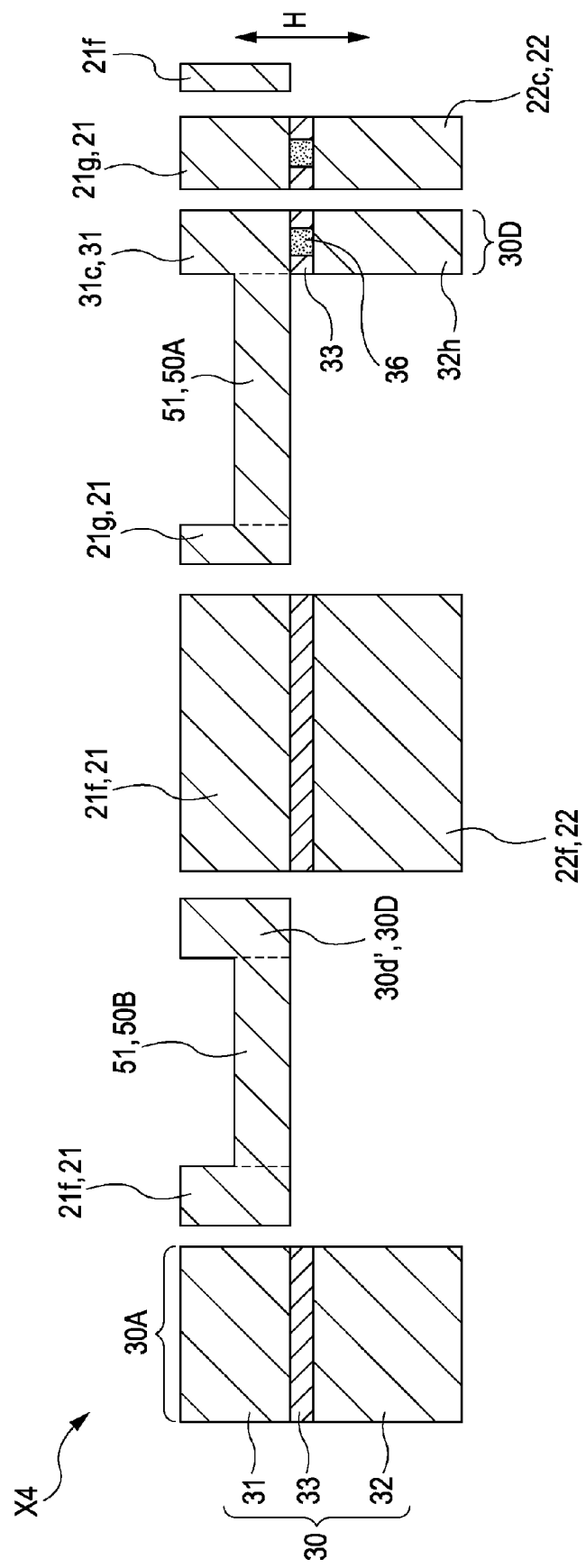
FIG. 29 is a sectional view taken on a line XXIX-XXIX of FIG. 26.

FIGS. 26 to 29 illustrate the micro oscillating device X4 included in the micro oscillating device array Y4. FIG. 26 is a plan view of the micro oscillating device X4. FIG. 27 is a plan view partially illustrating the micro oscillating device X4. FIGS. 28 and 29 are sectional views taken on a line XXVIII-XXVIII and a line XXIX-XXIX of FIG. 26.

The micro oscillating device X4 includes the oscillating portion 10, the frame 20, the frame 30, the pair of coupling portions 40, the pair of coupling portions 50A and 50B, and the electrode portions 60, 70, and 80. In the fourth embodiment, for example, the micro oscillating device X4 is applied to the micro mirror device. Similarly to the micro oscillating device X1, the micro oscillating device X4 is produced by processing the material substrate using the bulk micromachining technique such as the MEMS technique. For example, the SOI wafer is used as the material substrate. The material substrate has the laminated structure including the first silicon layer, the second silicon layer, and the insulating layer between the first and second silicon layers. The conductive property is imparted to the first and second silicon layers by doping an impurity. Each region included in the micro oscillating device X4 is formed while mainly derived from the first silicon layer or the second silicon layer. For the purpose of clarification of the drawing, the region that is derived from the first silicon layer and projected toward the near side of the paper plane from the insulating layer is drawn by hatching in FIG. 26. The structure of FIG. 27 is derived from the second silicon layer in the micro oscillating device X4.

The micro oscillating device X4 differs from the micro oscillating device X1 of the first embodiment in parts of the structures of the frames 20 and 30. Other structures of the micro oscillating device X4 are similar to those of the micro oscillating device X1.

The frame 20 of the fourth embodiment differs from the frame 20 of the first embodiment in a shape of the extended shape portion 20B. Further, the frame 20 of the fourth embodiment differs from the frame 20 of the first embodiment in that the first layer portion 21 includes portions 21*f* and 21*g* instead of the portions 21*a* and 21*b* and the second layer portion 22 includes a portion 22*f* instead of the portion 21*a*. In the fourth embodiment, the portion 21*f* of the frame 20 constitutes parts of the surrounding shape portion 20A and extended shape portion 20B. The portion 21*f* of the frame 20 of the fourth embodiment differs from the portion 21*a* of the first embodiment in the shape of the extended shape portion 20B. The portion 21*g* constitutes parts of the surrounding shape portion 20A and extended shape portion 20B. The portion 21*g* differs from the portion 21*b* of the first embodiment in that the portion 21*g* also constitutes a part of the extended shape portion 20B. The portion 22*f* constitutes parts of the surrounding shape portion 20A and extended shape portion 20B. The portion 22*f* differs from the portion 22*a* of the first embodiment in the shape of the extended shape portion 20B. In the frame 20 of the fourth embodiment, other configurations are similar to those of the frame 20 of the first embodiment.

The frame 30 of the fourth embodiment differs from the frame 30 of the first embodiment in that the frame 30 of the fourth embodiment includes an arm 30D instead of the arm 30B. As shown in FIG. 26, the arm 30D is extended from the support base 30A and bent toward the movable portion or the oscillating portion 10. The arm 30D includes a branch portion 30*d'*. As shown in FIG. 28, in a part of the arm 30D, the aspect ratio in which a length T5 in the thickness direction H is divided by a width W5 is larger than one. That is, the arm 30D has a region whose width is smaller than the length in the thickness direction H. The configuration is suitable for ensuring the bending strengths in the thickness direction H (mechanical strength to the load applied in the thickness direction H) of the arm 30D and device.

As shown in FIGS. 26 and 29, the arm 30D includes a portion 31*c* in the first layer portion 31. As shown in FIG. 27, the arm 30D includes portions 32*h* and 32*i* in the second layer portion 32, and the portions 32*h* and 32*i* are separated with a gap. The portion 32*h* is connected to the portion 32*a* of the support base 30A. The portion 32*i* is connected to the portion 32*b* of the support base 30A. As shown in FIG. 29, the portions 31*c* and 32*h* in the arm 30D are electrically connected through a conductive via 36 pierced through the insulating layer 33.

As shown in FIG. 26, each coupling portion 40 (two torsion bars 41) of the fourth embodiment is connected to the beam portion 13 of the oscillating portion 10 and the portion 21*f* of the first layer portion 21 of the frame 20. Therefore, the oscillating portion 10 and the frame 20 are coupled to each other. The beam portion 13 and the portion 21*f* are electrically connected through the coupling portion 40.

As shown in FIG. 29, the coupling portion 50A of the fourth embodiment is connected to the portion 21*g* of the first layer portion 21 of the frame 20 and the portion 31*c* of the first layer portion 31 in the arm 30D of the frame 30. Therefore, the frames 20 and 30 are coupled to each other. The portions 21*g* and 31*c* are electrically connected through the coupling portion 50A.

As shown in FIG. 29, the coupling portion 50B of the fourth embodiment is connected to the portion 21*f* of the first layer portion 21 of the frame 20 and the branch portion 30*d'* of the arm 30D of the frame 30. Therefore, the frames 20 and 30 are coupled to each other. The portion 21*f* and the branch portion 30*d'* are electrically connected through the coupling portion 50B.

As shown in FIG. 27, the electrode portion 60 of the fourth embodiment includes the arm 61, the plural electrode teeth 62*a*, and the plural electrode teeth 62*b*. The arm 61 is extended from the portion 22*c* of the second layer portion 22 of the frame 20.

The electrode portion 70 of the fourth embodiment includes the plural electrode teeth 71. As shown in FIGS. 26 and 28, the plural electrode teeth 71 are extended toward the electrode portion 80 from the portion 21*f* of the first layer portion 21 of the frame 20. While separated from one another, the plural electrode teeth 71 are arrayed in the direction in which the shaft center A2 is extended.

The electrode portion 80 of the fourth embodiment includes plural electrode teeth 81. As shown in FIGS. 27 and 28, the plural electrode teeth 81 are extended toward the electrode portion 70 from the portion 32*i* of the second layer portion 32 of the arm 30D. While separated from one another, the plural electrode teeth 81 are arranged in the direction in which the shaft center A2 is extended.

In driving the micro oscillating device X4, the reference potential is imparted to the electrode portion 12 of the oscillating portion 10 and the electrode portion 70. The reference potential is imparted to the electrode portion 12 through the first layer portion 31 of the frame 30, the torsion bars 51 of the coupling portion 50B, the portion 21*f* of the first layer portion 21 of the frame 20, the torsion bars 41 of the coupling portion 40, and the beam portion 13 of the oscillating portion 10. The reference potential is imparted to the electrode portion 70 through the first layer portion 31 of the frame 30, the torsion bars 51 of the coupling portion 50B, and the portion 21f of the first layer portion 21 of the frame 20. Preferably the reference potential is kept constant. For example, the ground potential is used as the reference potential.

In the micro oscillating device X4, the drive potential that is higher than the reference potential is imparted to the electrode portion 60 as needed, thereby generating the electrostatic attractive force between the electrode portions 12 and 60 to rotate the oscillating portion 10 about the shaft center A1. At the same time, in the micro oscillating device X4, the drive potential that is higher than the reference potential is imparted to the electrode portion 80 as needed, thereby generating the electrostatic attractive force between the electrode portions 70 and 80 to rotate the frame 20 and the oscillating portion 10 about the shaft center A2. The micro oscillating device X4 is the two-shaft oscillating device. The drive potential is imparted to the electrode portion 60 through the portion 32a of the second layer portion 32 in the support base 30A of the frame 30, the portion 32h of the second layer portion 32 in the arm 30D, the conductive via 36 on the portion 32h, the portion 31c on the conductive via 36, the torsion bars 51 of the coupling portion 50A, the portion 21g of the first layer portion 21 in the frame 20, the conductive via 26 on the portion 21g, and the portion 22c on the conductive via 26. The drive potential is imparted to the electrode portion 80 through the portion 32b of the second layer portion 32 in the support base 30A of the frame 30 and the portion 32i of the second layer portion 32 in the arm 30D. The direction of the light reflected from the mirror surface 11a on the land portion 11 of the oscillating portion 10 in the micro oscillating device X4 can be switched by the two-shaft oscillation drive.

The micro oscillating device array Y4 includes the plural micro oscillating devices X4 having the above-described configurations. In the micro oscillating device array Y4, the plural micro oscillating devices X4 are arranged in line such that all the shaft centers A2 (not shown in FIG. 25) are in parallel with one another.

In the micro oscillating device array Y4, the frames 30 of the micro oscillating devices X4 are integrated to form the frame body. The frames 30 surround all the movable portions including the oscillating portions 10 and the frames 20 in the micro oscillating devices X4. The first layer portion 31 of the frame 30 is continuously formed in all the micro oscillating devices X4 except for the portions 31c. Accordingly, the electrode portion 12 and shield portion 14 of the oscillating portion 10, the portion 21f of the first layer portion 21 and the portions 22b and 22f of the second layer portion 22 of the frame 20, and the electrode portion 70 are electrically connected in all the micro oscillating devices X4.

In driving the micro oscillating device array Y4, the reference potential is commonly imparted to the electrode portion 12 of the oscillating portions 10 and the electrode portions 70 in all the micro oscillating devices X4. At this point, the drive potentials are imparted to the electrode portions 60 and 80 of the selected micro oscillating device X4, respectively. Therefore, the oscillating portion 10 and frame 20 of each micro oscillating device X4 are individually oscillated to switch the direction of the light reflected from the mirror surface 11a on the land portion 11 in the oscillating portion 10 of the micro oscillating device X4.

Each micro oscillating device X4 included in the micro oscillating device array Y4 is the two-shaft oscillating device. As described above, each micro oscillating device X4 includes the oscillating portion 10, the frame 20 coupled to the oscillating portion 10, and the frame 30 coupled to the frame 20. In each micro oscillating device X4, the frames 20 and 30 are coupled between the support base 30A of the frame 30 and the oscillating portion 10 by the coupling portions 50A and 50B. Specifically, the coupling portion 50A (two torsion bars 51) that couples the frames 20 and 30 is connected to the frame 20 and the arm 30D between the oscillating portion 10 and the support base 30A. The coupling portion 50B (two torsion bars 51) is connected to the frame 20 and the arm 30D (or the branch portion 33d') between the oscillating portion 10 and the support base 30A. That is, in each micro oscillating device X4, the movable portion including the oscillating portion 10 and frame 20 is supported by the support base 30A of the frame 30 with the coupling portions 50A and 50B and the arm 30D interposed therebetween.

In each micro oscillating device X4 in which the frame 30 supports the movable portion based on the cantilever structure, the oscillating portion 10 is not located between the pair of coupling portions 50A and 50B that couples the frames 20 and 30, so that the frame 20 can adopt the structure in which the land portion 11 of the oscillating portion 10 is not surrounded for the same reason as the micro oscillating device X1 of the first embodiment. Therefore, in the micro oscillating device array Y4, the land portions 11 of the oscillating portions 10 can sufficiently be brought close to each other in the adjacent micro oscillating devices X4 for the same reason as the micro oscillating device array Y1 of the first embodiment. In the micro oscillating device array Y4, the sufficiently high occupied ratio of the land portion 11 or mirror surface 11a can be realized in the direction in which the devices are arrayed. As the occupied ratio of the land portion 11 or mirror surface 11a in the device array direction is increased, the signal loss of the light reflected from each mirror surface 11a can be reduced in the whole of the micro oscillating device array Y4.

The electrode portion 12 of the oscillating portion 10, the shield portion 14, and the portions 22b and 22f of the second layer portion 22 of the frame 20 are electrically connected in each micro oscillating device X4 of the micro oscillating device array Y4, so that the reference potential (for example, the ground potential) is imparted not only to the electrode portion 12 but also to the shield portion 14 and the portions 22b and 22f in driving the device. Therefore, the electric field is easily absorbed by the shield portion 14. The electric field is caused by the predetermined drive potential that is higher than the reference potential, and is generated from the electrode portion 60 toward the land portion 11 of the oscillating portion 10 in driving the device. At the same time, the portions 22b and 22f easily absorb the electric field generated from the electrode portion 60 in driving the device. The electric field absorption effects prevent or restrain the leakage of the electric field to the outside of the device in the micro oscillating device X4. The electric field leaking from the drive mechanism including the electrode portions 12 and 60 of one of the micro oscillating devices X4 in the micro oscillating device array Y4 can be prevented from adversely affecting the drive characteristic of the adjacent micro oscillating device X4 by the prevention or restraint of the leakage of the electric field to the outside of the device. Accordingly, the electric field absorption effects contribute to the greater density in the direction in which the micro oscillating devices X4 are arrayed and the high occupied ratio of the land portion 11 or mirror surface 11a in the direction in which the devices are arrayed.

In each micro oscillating device X4 of the micro oscillating device array Y4, similarly to the micro oscillating device X1, in the arm 20A' of the frame 20, the aspect ratio in which the length T1 in the thickness direction H is divided by the width W1 is larger than one. Therefore, the arm 20A' has the structure in which the bending strength in the thickness direction H is easy to ensure. At the same time, as described above with reference to FIG. 28, in the arm 30D of the frame 30, the aspect ratio in which the length T5 in the thickness direction H is divided by the width W5 is larger than one. Therefore, the arm 30D has the structure in which the bending strength in the thickness direction H is easy to ensure. In the micro oscillating device X4 in which the support base 30A of the frame 30 supports the movable portion by the cantilever structure, the configuration is suitable for ensuring the bending strength in the thickness direction H in the support structure between the oscillating portion 10 and the support base 30A.

The micro oscillating device X4 may be applied to sensing devices such as the angular velocity sensor and the acceleration sensor. In the micro oscillating device X4 applied to the sensing device, it is not always necessary to provide the mirror surface 11a on the land portion 11 of the oscillating portion 10. In cases where the micro oscillating device X4 is applied to the angular velocity sensor, the method for detecting the angular velocity with the micro oscillating device X4 is similar to the method for detecting the angular velocity with the micro oscillating device X1 of the first embodiment applied to the angular velocity sensor. In cases where the micro oscillating device X4 is applied to the acceleration sensor, the method for detecting the acceleration with the micro oscillating device X4 is similar to the method for detecting the acceleration with the micro oscillating device X1 of the first embodiment applied to the acceleration sensor.

The micro oscillating devices X1 to X4 may be applied to the micro mirror device used in the optical switching apparatus.

Figure 30:
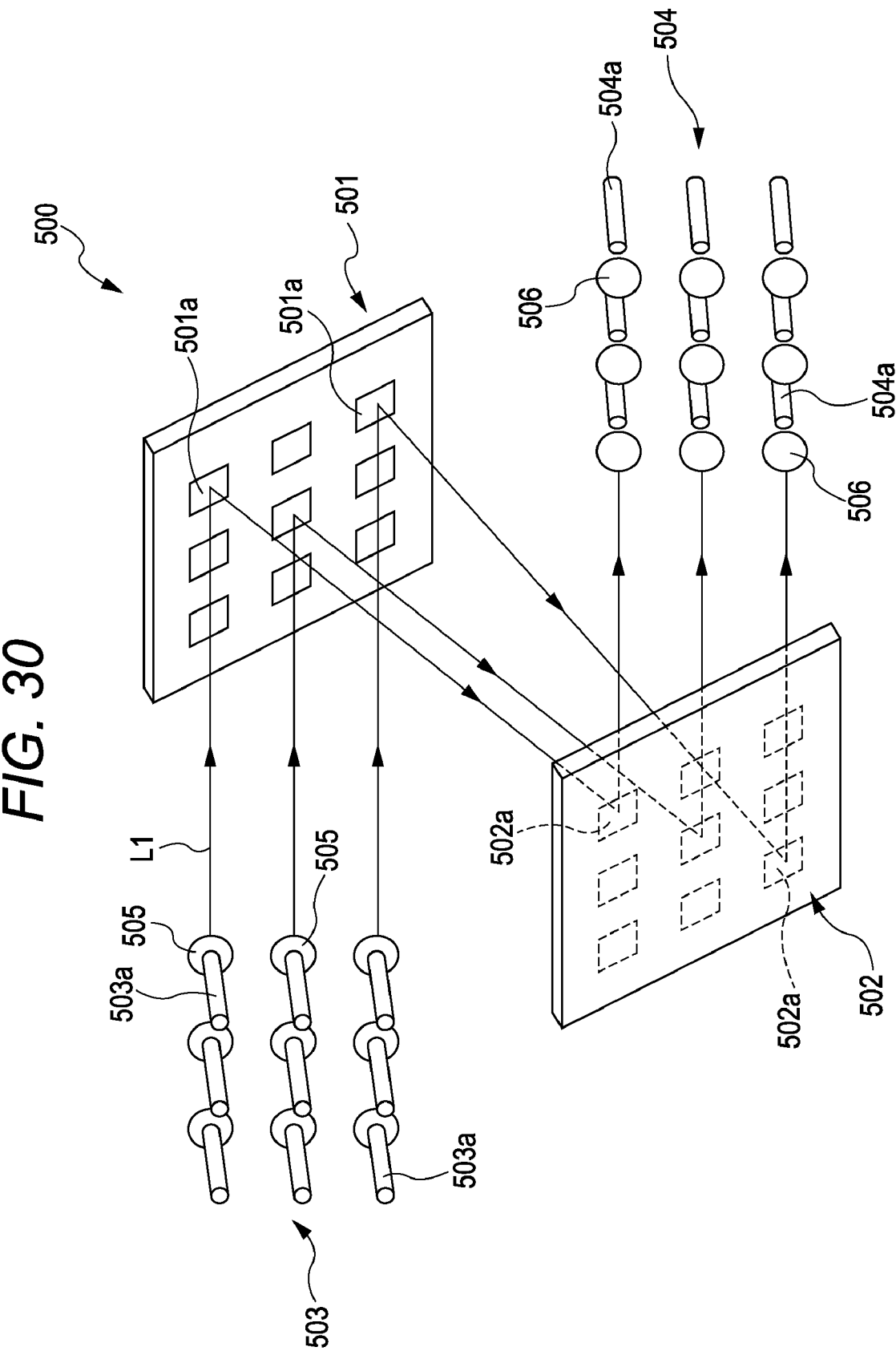
FIG. 30 is a schematic diagram illustrating an optical switching apparatus according to a fifth embodiment.

FIG. 30 is a schematic diagram illustrating a spatial light coupling type optical switching apparatus 500 according to a fifth embodiment. The optical switching apparatus 500 includes a pair of micro mirror array units 501 and 502, an input fiber array 503, an output fiber array 504, and plural micro lenses 505 and 506. The input fiber array 503 includes plural input fibers 503a. Plural micro mirror devices 501a corresponding to each input fiber 503a are provided in the micro mirror array unit 501. The output fiber array 504 includes plural output fibers 504a. Plural micro mirror devices 502a corresponding to each output fiber 504a are provided in the micro mirror array unit 502. Each of the micro mirror devices 501a and 502a has a mirror surface that reflects light, and the micro mirror device controls an orientation of the mirror surface. One of the micro oscillating devices X1 to X4 is used as each of the micro mirror devices 501a and 502a. Each of the plural micro lenses 505 faces an end portion of the input fiber 503a. Each of the plural micro lenses 506 faces an end portion of the output fiber 505a.

In the optical switching apparatus 500, output light beams L1 from the input fibers 503a pass through the corresponding micro lenses 505. Therefore, the light beams L1 are formed into parallel light, and travel to the micro mirror array unit 501. The light beam L1 is reflected by the corresponding micro mirror device 501a and deflected toward the micro mirror array unit 502. At this point, the mirror surface of the micro mirror device 501a is orientated toward a predetermined direction such that the light beam L1 is incident to the desired micro mirror device 502a. Then the light beam L1 is reflected by the micro mirror device 502a and deflected toward the output fiber array 504. At this point, the mirror surface of the micro mirror device 502a is orientated toward a predetermined direction such that the light beam L1 is incident to the desired output fiber 504a.

In the optical switching apparatus 500, the light beam L1 is deflected by the micro mirror array units 501 and 502, and the output light beam L1 from each input fiber 503a reaches the desired output fiber 504a. That is, the input fiber 503a and the output fiber 504a correspond one-on-one to each other. The output fiber 504a that the light beam L1 reaches is switched by appropriately changing deflection angles of the micro mirror devices 501a and 502a.

In the optical switching apparatus that switches a transmission path of an optical signal transmitted through an optical fiber from a fiber to another fiber, examples of the characteristic include a large capacity, a high speed, and high reliability in the switching operation. From these standpoints, preferably the micro mirror device that is produced by the micromachining technique is used as the switching device incorporated in the optical switching apparatus. The micro mirror device is preferably used to obtain the characteristics, because the switching process can directly be performed to the optical signal without converting the optical signal into the electric signal between the input-side optical transmission path and the output-side optical transmission path in the optical switching apparatus.

Figure 31:
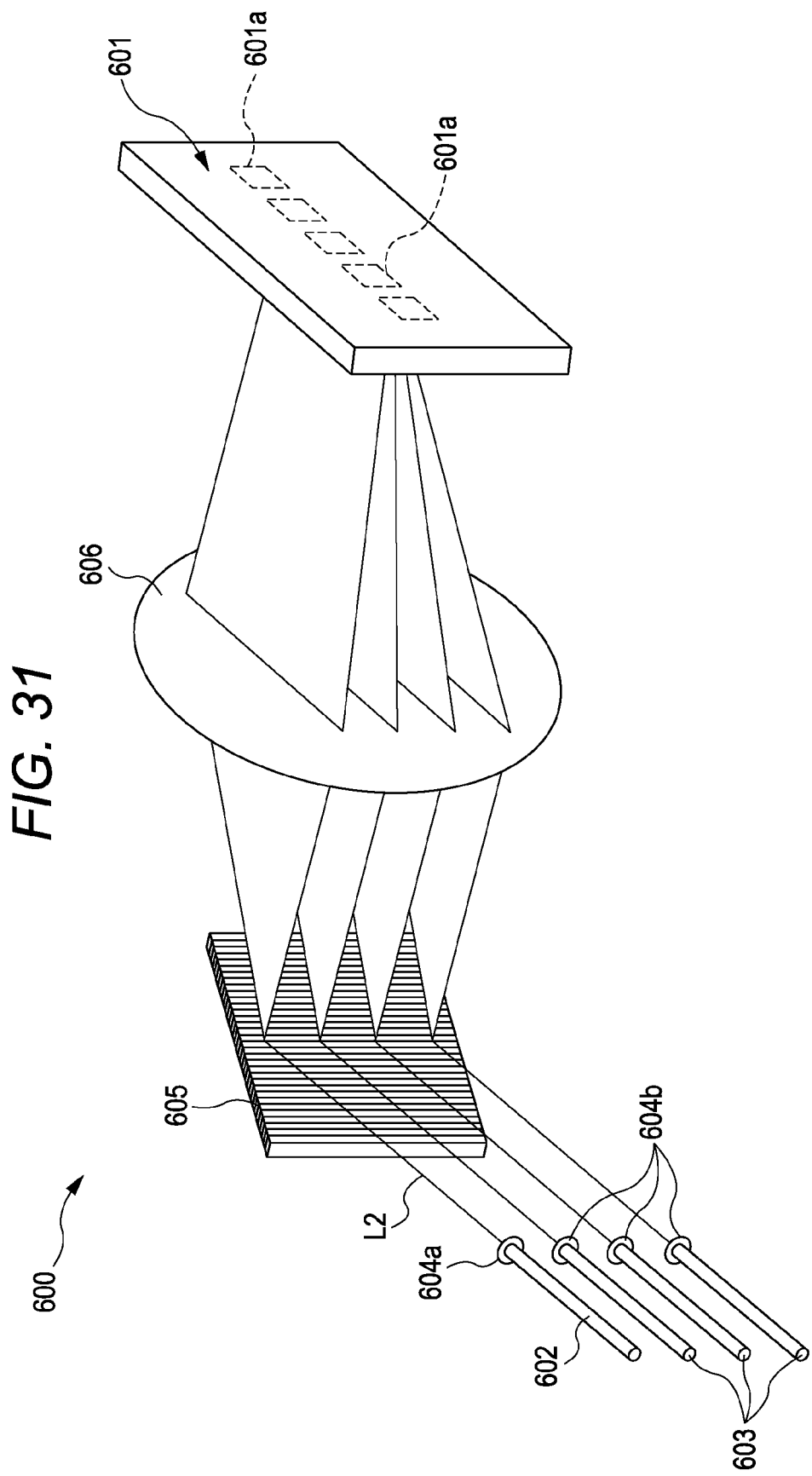
FIG. 31 is a schematic diagram illustrating an optical switching apparatus according to a sixth embodiment.

FIG. 31 is a schematic diagram illustrating a wavelength-selective optical switching apparatus 600 according to a sixth embodiment. The optical switching apparatus 600 includes a micro mirror array unit 601, one input fiber 602, three output fibers 603, plural micro lenses 604a and 604b, a spectroscope 605, and a collective lens 606. The micro mirror array unit 601 includes plural micro mirror devices 601a. For example, the plural micro mirror devices 601a are arranged in line in the micro mirror array unit 601. Each micro mirror device 601a has a mirror surface that reflects light, and the micro mirror device controls an orientation of the mirror surface. One of the micro oscillating devices X1 to X4 is used as each micro mirror device 601a. That is, the micro mirror array unit 601 can be formed by one of the micro oscillating device arrays Y1 to Y4. The micro lens 604a faces an end portion of the input fiber 602. The micro lens 604b faces an end portion of the output fiber 603. The spectroscope 605 is a reflection type diffraction grating in which a degree of diffraction of the reflected light depends on a wavelength.

In the optical switching apparatus 600, output light beams L2 (plural wavelengths are mixed) from the input fibers 602 pass through the corresponding micro lenses 604a. Therefore, the light beams L2 are formed into parallel light. The light beam L2 is reflected by the spectroscope 605. At this point, the light beams L2 are reflected with different angles from one wavelength to another. The reflected light beams pass through the collective lens 606. At this point, in the micro mirror array unit 601, the reflected light beams are collected into the corresponding micro mirror device 601a in each wavelength. The light beam having each wavelength is reflected toward a predetermined direction by the corresponding micro mirror device 601a. At this point, the mirror surface of the micro mirror device 601a is orientated toward a predetermined direction such that the light beam having each wavelength reaches the desired output fiber 603. The light beam reflected from the micro mirror device 601a is incident to the selected predetermined output fiber 603 through the collective lens 606, the spectroscope 605, and the micro lens 604b. Thus, in the optical switching apparatus 600, the light beam having the desired wavelength can be selected from the light beam L2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A micro oscillating device comprising:
a first frame;
an oscillating portion;
a first twist coupling portion and a second twist coupling portion that couple the first frame and the oscillating portion to define a first shaft center of an oscillating operation of the oscillating portion;
a second frame that includes a support base and an arm portion extended from the support base toward the oscillating portion; and
a third twist coupling portion and a fourth twist coupling portion that couple the second frame and the first frame to define a second shaft center of an oscillating operation of the first frame,
wherein the third twist coupling portion is coupled to the first frame and the arm portion between the oscillating portion and the support base, and
the fourth twist coupling portion is coupled to the first frame and the support base or the arm portion between the oscillating portion and the support base, and
the support base and the arm portion are formed of one body.

2. The micro oscillating device according to claim 1, wherein the first shaft center and the second shaft center are orthogonal to each other.

3. The micro oscillating device according to claim 1, wherein the oscillating portion includes an oscillating function portion, a first electrode portion, and a beam portion that couples the oscillating function portion and the first electrode portion,
the first frame includes a shape surrounding the first electrode portion side of the oscillating portion,
the first and second twist coupling portions are coupeled to the beam portion in the oscillating portion, and
a second electrode portion is fixed to the first frame, the second electrode portion for generating a drive force of the oscillating operation of the oscillating portion in cooperation with the first electrode portion.

4. The micro oscillating device according to claim 3, wherein each of the first and second electrode portions is a comb electrode including a plurality of electrode teeth which are arranged in line.

5. The micro oscillating device according to claim 3, further comprising:
a third electrode portion that is fixed to the arm portion; and
a fourth electrode portion that is fixed to the first frame for generating a drive force of the oscillating operation of the first frame in cooperation with the third electrode portion.

6. The micro oscillating device according to claim 5, wherein each of the third and fourth electrode portions is a comb electrode including a plurality of electrode teeth which are arranged in line.

7. The micro oscillating device according to claim 4, wherein each of the electrode teeth of the comb electrode includes a width that is smaller than a length in a thickness direction of the micro oscillating device.

8. The micro oscillating device according to claim 6, wherein each of the electrode teeth of the comb electrode includes a width that is smaller than a length in a thickness direction of the micro oscillating device.

9. The micro oscillating device according to claim 1, wherein the arm portion includes a region whose width is smaller than a length in a thickness direction of the micro oscillating device.

10. The micro oscillating device according to claim 1, wherein the first frame includes a region whose width is smaller than a length in a thickness direction of the micro oscillating device.

11. The micro oscillating device according to claim 1, further comprising a coupling portion that couples the oscillating portion and the second frame to tentatively fix the oscillating portion to the second frame.

12. A micro oscillating device array comprising a plurality of micro oscillating devices that are arrayed,
wherein each of the micro oscillating devices includes:
a first frame;
an oscillating portion;
a first twist coupling portion and a second twist coupling portion that couple the first frame and the oscillating portion to define a first shaft center of an oscillating operation of the oscillating portion;
a second frame that includes a support base and an arm portion extended from the support base toward the oscillating portion; and
a third twist coupling portion and a fourth twist coupling portion that couple the second frame and the first frame to define a second shaft center of an oscillating operation of the first frame,
the third twist coupling portion is coupled to the first frame and the arm portion between the oscillating portion and the support base, and
the fourth twist coupling portion is coupled to the first frame and the support base or the arm portion between the oscillating portion and the support base ,and
the support base and the arm portion are formed of one body.

13. The micro oscillating device array according to claim 12, wherein the first shaft centers of the micro oscillating devices are parallel to each other, and
the second shaft centers of the micro oscillating devices are parallel to each other.

14. An optical switching apparatus comprising:
a first frame;
an oscillating portion that includes an oscillating function portion, a first electrode portion, and a beam portion coupling the oscillating function portion and the first electrode portion;
a first twist coupling portion and a second twist coupling portion that couple the first frame and the oscillating portion to define a first shaft center of an oscillating operation of the oscillating portion;
a mirror portion that is provided on the oscillation function portion and reflects incident light;
a second frame that includes a support base and an arm portion extended from the support base toward the oscillating portion;
a third twist coupling portion and a fourth twist coupling portion that couple the second frame and the first frame to define a second shaft center of an oscillating operation of the first frame; and a second electrode portion that is fixed to the first frame to generate a drive force of the oscillating operation of the oscillating portion in cooperation with the first electrode portion,
wherein the third twist coupling portion is coupled to the first frame and the arm portion between the oscillating portion and the support base, and the fourth twist coupling portion is coupled to the first frame and the support base or the arm portion between the oscillating portion and the support base, and
the support base and the arm portion are formed of one body.

* * * * *